US010555045B2

(12) United States Patent
Shaw et al.

(10) Patent No.: US 10,555,045 B2
(45) Date of Patent: Feb. 4, 2020

(54) CONTEXT-BASED RECOMMENDATION SYSTEM

(71) Applicant: PIKSEL, INC., Wilmington, DE (US)

(72) Inventors: Philip Antony Shaw, York (GB); Peter Heiland, Wilmington, DE (US); Ralf Wilhelm Tillmann, Mannheim (DE); Hans-Juergen Maas, Mainz (DE)

(73) Assignee: PIKSEL INC., Wilmington, DE (US)

( * ) Notice: Subject to any disclaimer, the term of this patent is extended or adjusted under 35 U.S.C. 154(b) by 0 days.

(21) Appl. No.: 15/021,256

(22) PCT Filed: Sep. 11, 2014

(86) PCT No.: PCT/EP2014/069459
§ 371 (c)(1),
(2) Date: Mar. 10, 2016

(87) PCT Pub. No.: WO2015/036518
PCT Pub. Date: Mar. 19, 2015

(65) Prior Publication Data
US 2016/0227291 A1 Aug. 4, 2016

Related U.S. Application Data

(60) Provisional application No. 62/033,445, filed on Aug. 5, 2014.

(30) Foreign Application Priority Data

Sep. 11, 2013 (GB) .................................. 1316196.3

(51) Int. Cl.
*H04N 21/482* (2011.01)
*H04N 21/25* (2011.01)
(Continued)

(52) U.S. Cl.
CPC ......... *H04N 21/4826* (2013.01); *H04L 51/02* (2013.01); *H04L 51/32* (2013.01);
(Continued)

(58) Field of Classification Search
CPC ......... H04N 21/4826; H04N 21/25891; H04N 21/26258; H04N 21/4383;
(Continued)

(56) References Cited

U.S. PATENT DOCUMENTS

2007/0265857 A1* 11/2007 Shivaji Rao ........... H04N 7/165
709/231
2009/0106304 A1* 4/2009 Song .................... G06K 9/6222
(Continued)

OTHER PUBLICATIONS

International Searching Authority, International Search Report and Written Opinion, dated Dec. 1, 2014, 15 pages.

*Primary Examiner* — Yassin Alata
(74) *Attorney, Agent, or Firm* — Holzer Patel Drennan

(57) ABSTRACT

A content delivery server configured to select from multiple content items a set of content items for display to a user at a user terminal, the content delivery server having access to content identifiers, identifying content items for delivery; a processor operating a content selection program which is arranged to receive the context data for different contexts and to select a set of content items in dependence on the context data, wherein the content items in the set vary with the context data, such that the content of items in a first set for a user in a first context are different from the content of items in a second set for the same user in a second context, and to transmit a recommendation message to the user terminal comprising a set of content identifiers.

20 Claims, 20 Drawing Sheets

(51) Int. Cl.
  *H04N 21/472*  (2011.01)
  *H04N 21/658*  (2011.01)
  *H04L 12/58*   (2006.01)
  *H04N 21/258*  (2011.01)
  *H04N 21/262*  (2011.01)
  *H04N 21/438*  (2011.01)
  *H04N 21/442*  (2011.01)
  *H04N 21/45*   (2011.01)
  *H04N 21/466*  (2011.01)
  *H04N 21/2668* (2011.01)
  *H04N 21/6543* (2011.01)
  *H04N 21/81*   (2011.01)
  *H04N 21/488*  (2011.01)
  *H04N 21/84*   (2011.01)
  *H04N 21/2665* (2011.01)
  *H04N 21/422*  (2011.01)

(52) U.S. Cl.
  CPC ..... *H04N 21/251* (2013.01); *H04N 21/25866* (2013.01); *H04N 21/25891* (2013.01); *H04N 21/2668* (2013.01); *H04N 21/26258* (2013.01); *H04N 21/4383* (2013.01); *H04N 21/4384* (2013.01); *H04N 21/44204* (2013.01); *H04N 21/44218* (2013.01); *H04N 21/4532* (2013.01); *H04N 21/4667* (2013.01); *H04N 21/4668* (2013.01); *H04N 21/472* (2013.01); *H04N 21/4882* (2013.01); *H04N 21/6543* (2013.01); *H04N 21/6582* (2013.01); *H04N 21/812* (2013.01); *H04N 21/84* (2013.01); *H04N 21/25825* (2013.01); *H04N 21/25833* (2013.01); *H04N 21/25841* (2013.01); *H04N 21/2665* (2013.01); *H04N 21/42202* (2013.01)

(58) Field of Classification Search
  CPC ......... H04N 21/44204; H04N 21/4532; H04N 21/4667; H04N 21/4668; H04N 21/251; H04N 21/472; H04N 21/6582; H04N 21/25866; H04N 21/2668; H04N 21/4384; H04N 21/44218; H04N 21/6543; H04N 21/812; H04N 21/4882; H04N 21/84; H04N 21/25825; H04N 21/25833; H04N 21/25841; H04N 21/2665; H04N 21/42202
  See application file for complete search history.

(56) References Cited

U.S. PATENT DOCUMENTS

| | | | | |
|---|---|---|---|---|
| 2011/0173663 | A1* | 7/2011 | Boudalier | H04H 60/72 725/46 |
| 2013/0024203 | A1* | 1/2013 | Flores | G06Q 30/02 705/1.1 |

* cited by examiner

| Tile 5 | Tile 4 | Tile 3 | Tile 2 | Tile 1 | |
|---|---|---|---|---|---|
| t (w5) | vs (w4) | a (w3) | vs (w2) | vs (w1) | HEADER |

| id | |
|---|---|
| title | |
| description | |
| keywords | |
| twitter_query | |
| locationId | |
| imageUrl | |
| Channel ImageUrl | |
| publishDate | |
| type | |
| url | |

CONTEXT-BASED RECOMMENDATION SYSTEM

CROSS-REFERENCE TO RELATED APPLICATIONS

The present application claims benefit of priority to Great Britain Patent Application No. 1316196.3, entitled "CONTENT DELIVERY AND DISPLAY SYSTEM" and filed on 11 Sep. 2013, which is specifically incorporated by reference herein for all that it discloses or teaches. The present application is further related to U.S. Provisional Patent Application No. 62/033,445, entitled "CONTENT DELIVERY AND DISPLAY SYSTEM" and filed on 5 Aug. 2014, which is also specifically incorporated by reference herein for all that it discloses or teaches. The present application is further a National Stage entry from International Patent Application No. PCT/EP2014/069459, entitled "CONTEXT-BASED RECOMMENDATION SYSTEM" and filed on 11 Sep. 2014, which is also specifically incorporated by reference herein for all that it discloses or teaches.

BACKGROUND

Content display and delivery systems exist to provide users of computer devices with information and entertainment. Content comprises a large number of different kinds of presentational materials, including images and text. Content includes dynamic media such as weather and news updates, social media such as Twitter and Facebook, information such as email and entertainment such as video. It is increasingly problematic for a user to efficiently and successfully navigate their way through this vast proliferation of content to receive and view only that which is relevant to him. This is wasteful of a user's time and network resources, as well as local processing and storage resources.

SUMMARY

An aspect of the invention provides a content delivery server configured to select from multiple content items a set of content items for display to a user at a user terminal, the content delivery server having access to content identifiers, identifying content items for delivery; a processor operating a content selection program which is arranged to receive the context data for different contexts and to select a set of content items in dependence on the context data, wherein the content items in the set vary with the context data, such that the content of items in a first set for a user in a first context are different from the content of items in a second set for the same user in a second context, and to transmit a recommendation message to the user terminal comprising a set of content identifiers.

Another aspect of the invention provides a computer device operating as a user terminal and comprising: a display for displaying content items to a user, at least one context sensor configured to sense a context of the user terminal and generate a context data item, a context collector configured to receive the at least one context data item and to generate context data, an interface for transmitting the context data to a content delivery server and for receiving a recommendation message from the content delivery server comprising a set of content item identifiers for content items selected based on the context data, wherein the display is operable to display the selected content items.

The invention also extends to a computer program product for implementing the methods and processes described herein, and a system comprising combinations of the computer devices/servers described herein.

For a better understanding of the present invention and to show how the same may be carried into effect, reference will now be made by way of example only to the accompanying drawings.

Figure 1:
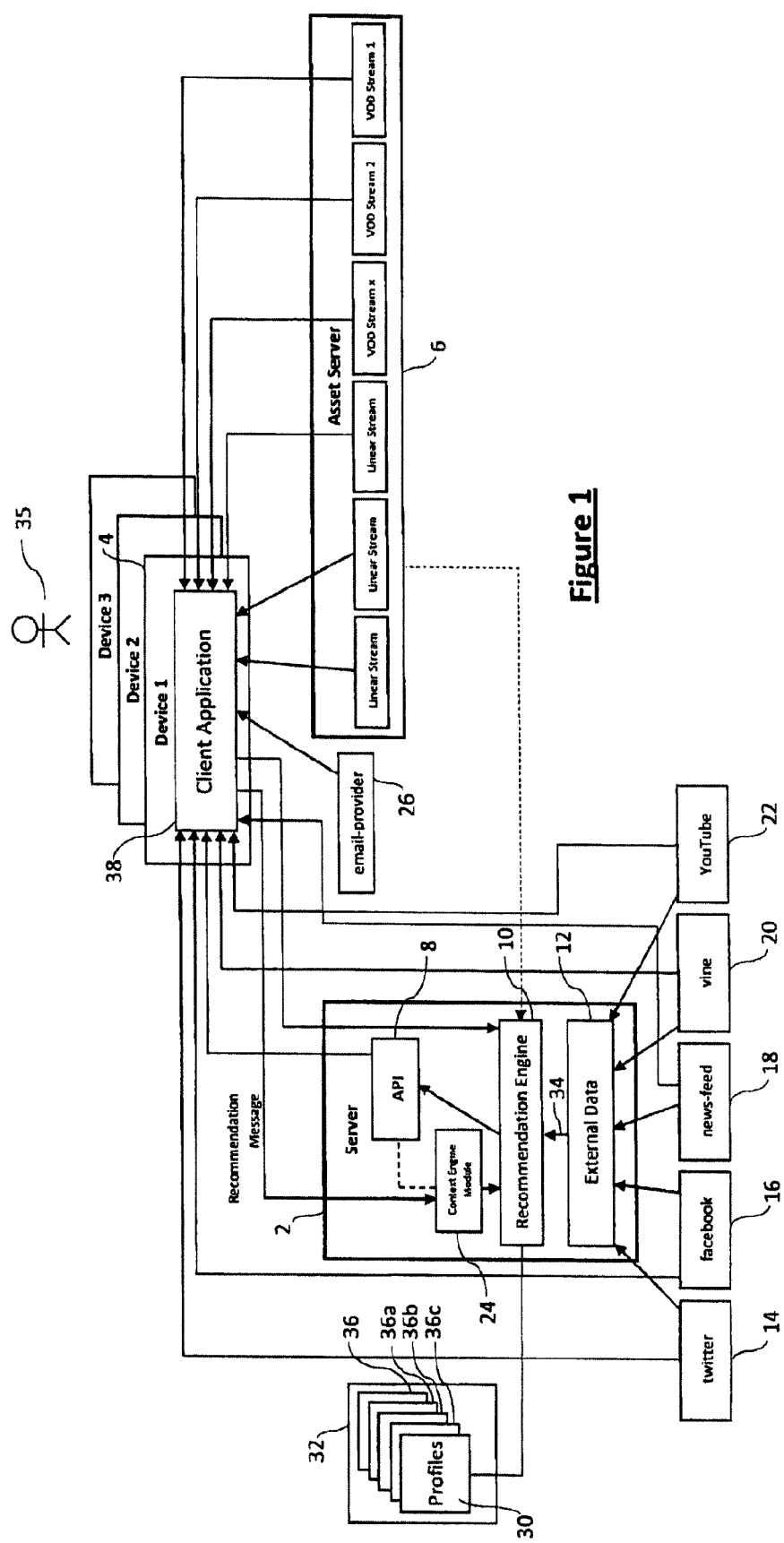
FIG. 1 is a schematic diagram of an overall architecture of a content delivery system.

One aim of the concepts described herein is to provide a new navigation paradigm that breaks from the norm from a traditional navigational paradigm. For VOD (video-on-demand) content this is typically static poster images with associated metadata, and for live content (LC) this is a traditional EPG (electronic programming guide).

According to the concepts described herein, the new navigation paradigm is based on user's navigating using a mosaic of tiles with video playback. The layout of the tiles can vary depending on the available screen size. For example, a 3×3 or 2×2 layout could be provided for tablets, and a 4×1 for Smartphones. For VOD content, the video displayed in the tile could be the first 60 seconds of the video displayed in a loop, and for live content it could be the actual live signal on an ongoing basis. Other features can be incorporated, such as email, chat, social media feeds like Facebook and video, etc.

Another aim of the concept described herein is to provide an architecture which constitutes an "ecosystem" for a service provider. At present, different kinds of devices run different kinds of operating systems, and therefore any provider of content is dependent on providing content to a number of different devices. Aggregation of content such as email, weather updates, social updates and other forms of dynamic media is possible by the device, governed by the OS of the particular device. In contrast, with the principles described herein, an application is provided which runs on top of the operating system and provides a complete aggregation of content and display function based on recommendations from a server. The server also governs how content is displayed at the client device, by not only recommending content items but delivering the content items associated with an ordering to the device. That ordering can be interpreted differently at different devices depending on the display resources. The content items include not only dynamic media, but other assets such as short form and long form video assets, including video on demand (VoD) and linear channel (LC) assets. The server can also receive content from different content sources and these content sources can both drive recommendations made by the server, as well as to deliver assets themselves directly to the device. This allows the service provider to "shape" content which is delivered to a user as he can generate some control over aggregation of the content sources as well as the content sources themselves and recommendations based on them.

According to another feature described herein, tiles for a specific user can be based on a recommended set of videos or channels based on user preferences and history. Recommended content is displayed in a manner dependent on the consuming device.

According to another feature, recommendations are made based on the context of a user, wherein the context defines user behaviour and provides insight into the kind of asset which a user may prefer in that context. The context can be a time of day, available time, location, device type, etc. Either or both of content and type of asset can vary with context.

The app described herein introduces a new User Interface (UI) style using tile based navigation and presenting highly personalised content to the user. This content can take the form of video, written word, and potentially music. In these embodiments, video is the main focus, with support from news articles and social media feeds.

While displayed items are the main focus, the concepts described herein extend to audible output such as voice delivered email and music.

The main page of the application is a trending topics page. This page presents topics of interest to the user. Each is presented as a still image with a title and sub heading. The user has the ability to enter pre-defined topics into a list in their context settings. The topics are also personalised using information from the user's Facebook feed, twitter feed, their location, and time of day, etc. Initial information gathering can be done through access to Facebook, Twitter, etc.

Once a topic has been selected, a user is presented with a number of items of content relating to that topic arranged in a tile formation. The arrangement of these tiles can be specified, and numbered 1 to 9, for example. The number of tiles the application is capable of presenting is also dependent on the size and resolution of the screen being used. On a television there may be 9 items presented, with videos running concurrently. On a mobile phone there may be 1 item presented, though in both cases more content will be visible by scrolling to the right (or in any other direction).

It is intended for the application to be highly personalised. A user will have specific input, but certain elements will be learnt by the application. For example, the schedule of the user, and their viewing habits at different points in the day. The user may only ever want to read the news at breakfast, watch you tube videos at lunch, and watch a movie after dinner. The app will respond by suggesting content on topics of interest within these parameters. Of course a mixture of all types of content can be presented at any time of day.

The form of the content can be described as long-form (movies, longer television programs), short-form (You Tube clips etc.), or articles. All content can be ordered by type within the tile view. This could be done by the user or the provider. This does not change the specific content presented, simply the type. There is no content from Twitter or Facebook presented at this point, though hashtags etc. from the user's feeds will be used to determine the content presented. Once a specific video has been selected, the feed information relative to its content can be presented via a screen separation to the right or any other direction. It is then possible to move to a related article presented in the news feed, from the video the user was previously watching. In addition, dynamic content such as weather updates or social medial can be provided. Tiles can display Twitter/Facebook, etc., e.g., latest tweets from known contacts or reminders about accepted Facebook events.

Notifications will be given when new topics of interest become available. This could be as a result of a breaking news event for example. The notification will appear against the reload button in the top left-hand corner of the screen. In one example, it resembles a small blue speech bubble with the number of notifications within it. Reloading will add this topic to the trending topics page. Articles can be presented alongside the news event. The article becomes full screen text on selection.

The layout could be mirrored from a smaller handheld device used for selection (mobile or tablet), while using a larger device to view the same layout of selections (TV, computer). It could then be possible to watch an item of content on the larger device, while continuing to browse content on the hand-held device, e.g. articles and feeds. There is an option for motion gestures (some kind of swipe, two fingers or pinch), to then move content of choice from the hand-held device to the main screen for viewing instead of currently displaying content.

It is also intended for motion to be used as a discriminator for current activity. The pattern and speed of movement of the user could be used to determine whether they are driving, on a train, running, or walking. Relevant content would then be presented. These would vary from each other greatly, as one may not wish to watch a long form video on a bus trip, but may on a train journey. Also a user would not be able to view content while driving, but may wish to listen to music or news, have an article read to them, or listen to the commentary of a sports event.

Metadata could contain cues for display of promoted items within the content being viewed. For example the user is watching James Bond, and an advert for the watch he is wearing appears. The cues within the metadata could also be filtered depending on the personalisation of the application.

Emails can also be accessed.

A user can "roll forward" a clock. This would be useful in certain instances. For example the user wishes to choose or browse content they may view in the evening in advance, either out of curiosity or to make a selection beforehand. This would avoid the introduction of an anomalous event within their schedule, which could potentially jeopardise the previously learnt schedule. The same may occur if the user is ill, and therefore not at work as usual, or on holiday.

Controlling the audio of the concurrently playing videos displayed within the tile view is available. A swiping motion up/down across the face of any tile controls the audio's volume. This allows a user to view one item while listening to another, which is particularly useful if viewing content on a television while browsing on another device. Also where content has audio deemed to not be desirable, e.g. sports commentary, etc.

The application can allow control of the 'ecosystem' of a household service provider who already provides a content based service to that household (or community of users).

FIG. 1 is a schematic architecture of a high level design of a content delivery system. A control server 2 is connected to a user terminal 4 by any suitable communication network, whether wired or wireless. The network is not shown in FIG. 1 for reasons of clarity. The user terminal 4 is also in communication with an asset server 6 via a same or different network. The asset server supplies video assets which can be linear stream assets or VOD assets. The user terminal 4 requests assets from the asset server 6 based on information which it receives from the control server 2. The control server 2 comprises an API (for example a REST API) 8, a recommendation engine 10, an external data aggregator 12 and a context engine module. The recommendation engine data aggregator and context engine module are all implemented by a suitably programmed processor or processors (not shown). The external data aggregator is connected to a number of sources external to the control server 2, again by any suitable communication network. In this example, these sources comprise a Twitter feed 14, a Facebook feed 16, a news-feed 18, a Vine feed 20 and a YouTube feed 22. These are exemplary only and it will readily be appreciated that other sources may be appropriate. The control server has access to user profiles 30, either in a local memory (not shown) or in a storage facility 32 accessible to the server. The external data aggregator 12 receives information from these multiple sources and monitors their content so as to be able to supply content based information 34 to the recommendation engine 10. In one mode, or context setting (described later) the recommendation engine 10 operates based on the content-based information supplied by the external data aggregator 12 to recommend video assets which can be accessed at the asset server 6. Thus the recommendation engine 10 has information about all assets available in the asset server 6 and operates to recommend assets based on the content-based information 34 it receives from the external data aggregator 12. In another mode, or context setting, the recommendation engine operates based on user profile or behaviour history, without referencing the content from the multiple sources. This will become evident in the context of the use cases to be described.

The user terminal 4 is labelled "Device 1". A user 35 may own multiple devices, which are indicated in FIG. 1 by the labelling Device 2, Device 3. Each of these devices is a user terminal. For example, a user 35 might own a tablet, a smartphone, and a laptop and a TV set. He may be using one or more devices at any particular time. In one particular use case mentioned later, he may for example, be using a smartphone (Device 1) and a TV set (Device 2), with the smartphone acting as a companion to the TV set. In any event, all the devices are capable of communicating with the server when they are active and logged on by the user. In FIG. 1, connections are shown between the user terminal 4 and the server 2. In particular, the user terminal 4 feeds data back to the context engine 24 and the recommendation engine 10. In addition, the devices can communicate with the asset server to obtain assets from the asset server.

In some of the examples described herein, the system is capable of delivering context recommendations based on the type of device that a user is currently logged in to.

The user 35 has a profile 36 in the user profile 30. In this user profile are stored preferences and other information about the user 35 to allow recommendations to be made based on information personal to that user. In the present system, the user can set up individual sub-profiles, 36a, 36b, 36c, etc. which allow him to have different preferences in different situations that he may find himself in. This means that recommendations based on the user sub-profiles could vary even for the same user when that user is in different settings. It will readily be appreciated that a single user is being discussed, but in practice the system operates with a large number of different users, where all users have profiles and sub-profiles set up for them respectively. Only a single profile and its sub-profiles is shown in FIG. 1 for the sake of convenience.

In addition to providing recommendations based on device type, the system provides recommendations based on other context parameters including location, time and available time as will become evident from the examples discussed later.

The multiple content sources 14 to 22 are also accessible to the user terminal 4 itself as denoted by the various arrows. The purpose of these connections is to allow the user terminal 4 to access content from the multiple sources 14 to 22 when invited to do so on the instructions received from the control server 2. Thus, these sources operate in two ways. Firstly, they provide content to the external data aggregator 12 for driving the recommendation engine 10, and secondly they provide content items for display to a user at the user terminal, when they are recommended to the user terminal.

The context engine module 24 influences the recommendation engine so that the recommendations are based on the context of a user. The context of a user is perceived here to govern the behaviour of a user and therefore to affect their likely preferences for engaging with content. The likely context based preferences for a user can be determined by monitoring historical behaviour of a user, or can default to certain conditions based on information about the user, for example, in his user profile. A user can set or override context parameters associated with the context engine module 24 should they wish to do so. The context engine module 24 also influences the recommendation engine to define the number n and type of assets to be recommended to a user, based on context.

The user device 4 executes a client application 38 which cooperates with the context engine 24 to deliver context based recommendation.

The content delivery system is capable of compiling video snippets based on various context parameters including: location, time (possibly short-form in the day and long-form in the evening), device (flat screen TV, laptop, mobile device), available time (that is, the time available to a user to engage with particular content. The terms short-form and long-form define different types of assets—other types of content include news articles, linear news, social content. As mentioned above, different types of assets can be stored in the asset server 6, or available from the multiple sources 14 to 22. In addition, other assets can be available from different sources (not shown), for example, static news articles. Herein, the term "content" refers to any type of displayed images or text to a user; a content item is a piece of content. The term "asset" is used herein to denote video assets and also other types of content items without limitation.

Thus, the content, type and number of the recommended assets varies with context.

Another type of context which can be derived is based on a user's "channel hop" behaviour. Content change signals are received at a processor executing a content change detection algorithm, wherein the content change signals denote a change of content being consumed at a user device. The detection algorithm compares the content change signals with a content change behaviour associated with that device to detect a surfing condition, and the surfing condition can be used to denote a context that the user is seeking new content.

Figure 2:
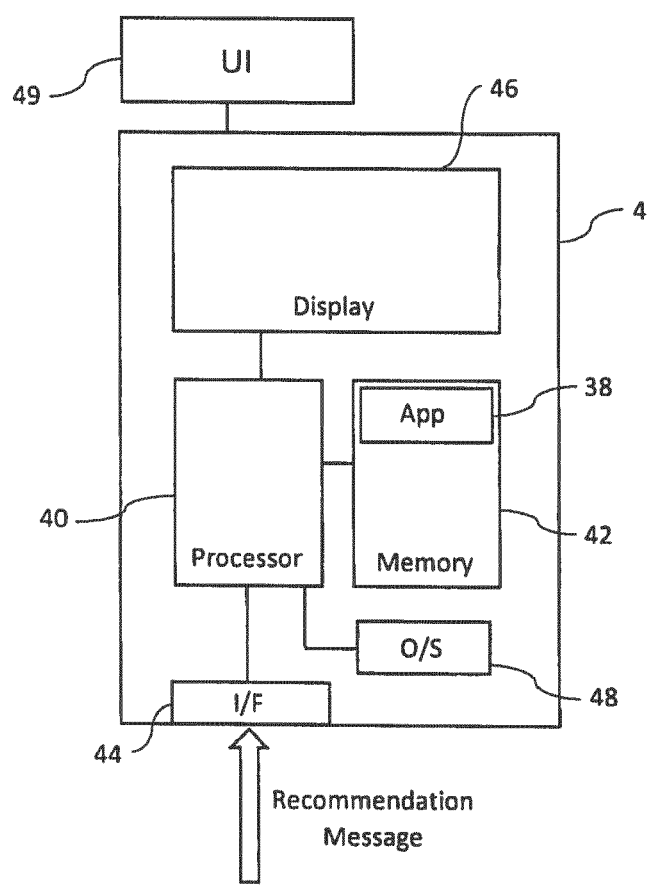
FIG. 2 is a schematic block diagram of a user device.

FIG. 2 is a schematic block diagram of a user terminal 4. The user terminal 4 comprises a processor 40 and a memory 42. The client application 38 is stored in the memory 42 and is executed by the processor 40. The user terminal 4 also has an interface 44 and a display 46. The display is controlled by the processor 40. As will be evident from the following, instructions received from the server in a recommendation message by the interface 44 are used by the processor to control the display 46. Although one processor is shown, it will be evident that the display could in fact be controlled by a dedicated graphics card or dedicated driver responsive to the instructions received from the server. The user terminal 4 has its own operating system 48. When delivering content of different types to a display 46 of a known computer device, such as a smartphone or tablet, it is the operating system which is generally responsible for aggregating different types of content and driving the display to display those different types of content. In the present system however it is the app 38 which is executed by the processor 40 and which is responsive to instructions in the recommendation message from the server which controls the display and allows the display to show different types of assets. Thus, the application can be delivered to different kinds of devices running different kinds of operating systems (for example, android, IOS, etc.). Thus, a similar experience can be delivered to users even if they are using different device types. Moreover, it is the server itself which manages the layout of the display for a particular device and the content recommendations for a particular user, so that the particular OS which is being executed by the device to support the basic operations of the device does not affect the system. Moreover, the server can deliver a recommendation message to any user terminal executing the app 38 regardless of its operating system. This allows an "eco system" to be developed wherein an operator of the server can manage the content sources and recommendations to best fit the users that it is used to engaging with, to make maximum use of the knowledge of those users, their behaviours and profiles, etc. For example, an owner of the server 2 can determine which content sources (14-22) are available and add their own specific content sources if they wish. This allows them to "shape" content delivered to a user.

A user may add his own source of content, subject to permission from the service provider.

Figure 3:
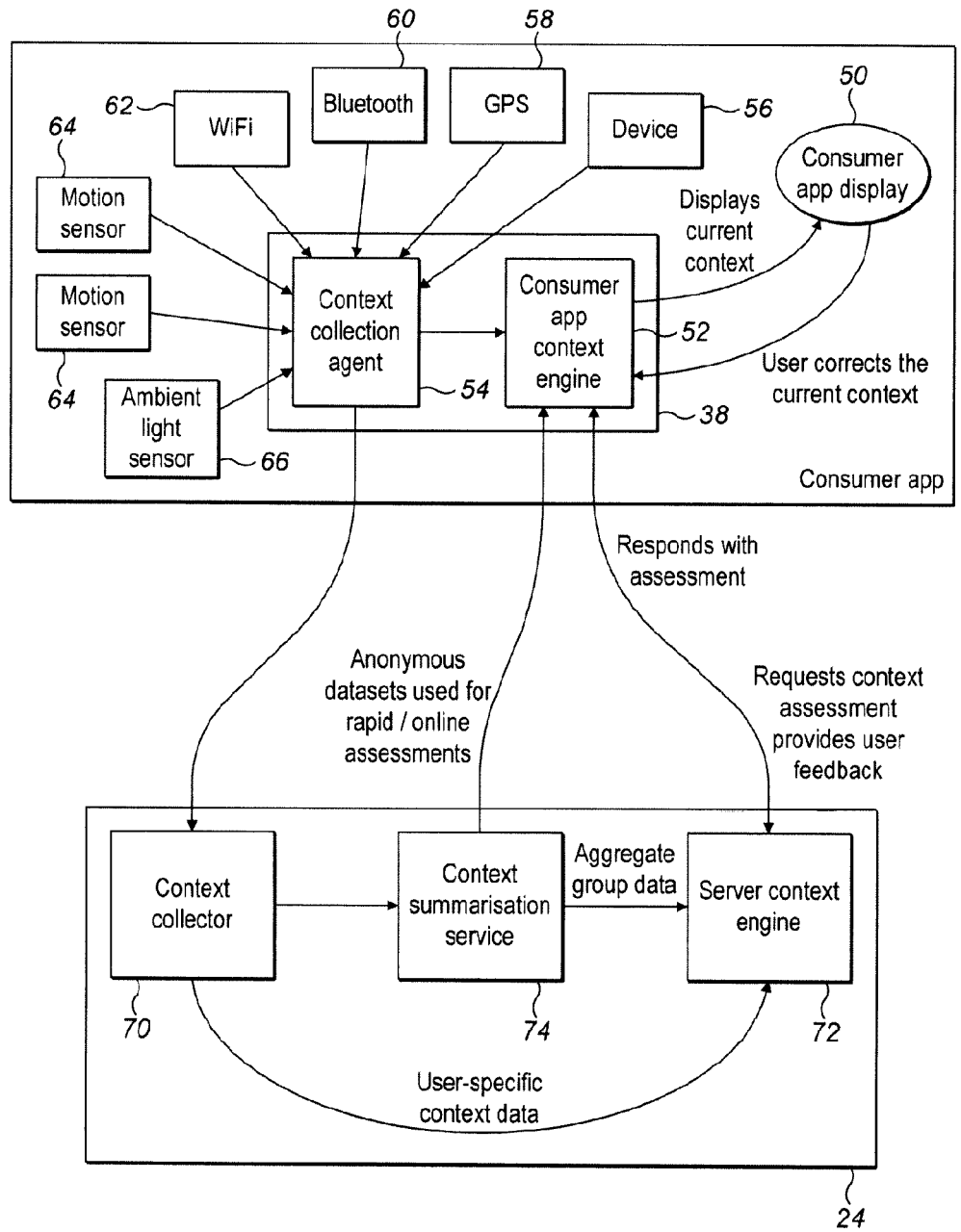
FIG. 3 is a schematic diagram illustrating the context engine at server side and client side.

Reference will now be made to FIG. 3 to describe how the context engine system works.

There are two parts: a client side part installed on the consumer's device 4 within our ecosystem app 38, and a server side part embodied in the module 24.

The Context Engine System (CES) (which includes both parts) is designed to provide a list of contexts within which it believes a given user exists at any particular moment.

Because the CES cannot know for sure what context a user is in, it provides its assessment as a list of probabilities. Any context assessed with a sufficiently high probability is considered to be 'active' for that user. Users can be in more than one context at once: for example, they could be at home and with family; or, at work but about to go on vacation; or, at a bar with work colleagues etc. . . .

A user always has visibility of the contexts the CES thinks they are in, as shown by the oval context display component 50 which shows context data to a user on the display 46. This presentation also gives the user the option to correct their context. Let's say the CES had thought they were at home enjoying some leisure time, but actually they are working from home; or they're on a business trip rather than a holiday. A user can engage with the display through a user interface (UI) touch screen, mouse, etc. to adapt their context.

The Context Engine logic 52, 54 is present within the consumer app 38 as well as the server so that the app is able to determine context even if there is limited access to the Internet. The whole idea of the ecosystem context is to make the app valuable to users. One way is to reduce its bandwidth footprint when on holiday using expensive cellular data.

The 'Context Collection Agent' 54 is a software service that resides within the consumer app 38, on the device 4, which collects information and intelligence from the sensors available to it. Some example servers are shown including device 56, location (GPS) 58, Bluetooth 80, Wi-Fi 62, motion servers 64, and ambient light sensor 66.

The Context Collection Agent does not simply record the raw data arising from these sensors but performs some basic calculations from it. The device server 56 provides local information about the device, e.g. the device type and its current time zone. For example, it tracks changes in time zone from the 'Device' and records this change as a significant event.

Likewise, it summarises rates of change of motion from the motion sensor to determine whether it believes the user is walking or being conveyed in some way.

Similarly, changes in WiFi network name, the security settings of a network, the rate of movement amongst local Bluetooth devices are all metrics to be tracked beyond the raw data any of these sensors provide.

This is what the Context Collection Agent collects and sends to the server side component Context Collector 70 whenever a network connection exists to do so.

It also makes this information available directly to the local Consumer App Context Engine 52.

The Context Collector 70 acts as a data collection endpoint for all users' context information. It is used by the server side service Server Context Engine 72 when it performs more detailed context assessments, as well as a Context Summarisation Service 74.

The Context Summarisation Services 74 takes all the data collected about all users and summarises it into recognisable groups and patterns.

Anonymised patterns, in this way, can be used by the Server Context Engine 72 to decide if a particular user's context information is a better match for one behaviour or another when calculating its probability list for them.

Different users commute at different times, for example. The Context Summarisation Service 74 will look at motion, GPS, pedometer and time of day information and summarise patterns for distinct groups of users. This information is used by the Server Context Engine 72 to fine tune its assessments.

Similarly, appropriate summary data sets will occasionally be provided to the consumer app so that it can use them to make rapid context assessments if it finds itself bandwidth constrained. Appropriate summary data sets are those which the server believes best match a user's typical behaviour which the Consumer App Context Engine 52 can use to make a best effort assessment while it waits for a better assessment from the server.

The Server Context Engine is a more functional version of the Consumer App Context Engine. It is able to perform more detailed analysis of a user's context inputs before making a determination of what it believes are the most probable contexts within which the user finds themselves. It has full access to anonymous data sets from the Context Summarisation Service 74 with which it can compare its assessments for a given user and adjust according to expected behaviours.

The Consumer App Context Engine is a pared down version of this capable of operating on a handheld device or set top box (STB). It uses information provided directly by the Context Collection Agent 54 to make assessments of what it things the user is doing. It balances this with information it may or may not receive from its server based counterpart.

The context display component 50 makes the current context assessments visible to the user so that they can see what has been determined and so that they can provide their feedback on this.

Feedback provided in this way is used to inform the context engines on both the consumer app and the server to allow it to adjust future assessments.

Figures 4, 5:
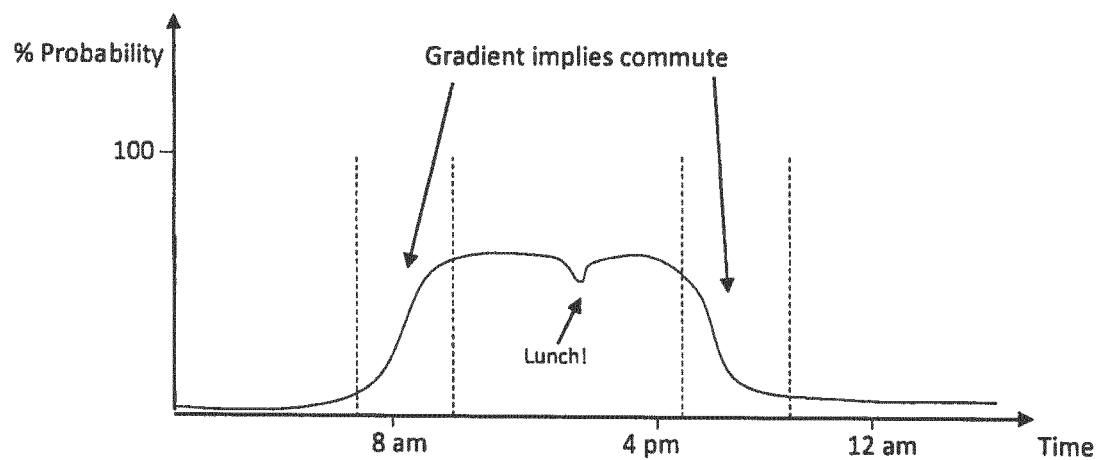
FIG. 4 is a graph exemplifying user behaviour.
FIG. 5 is a schematic diagram of a recommendation message.

For example; suppose the system guesses a context that's wrong and the user corrects this to say 'I'm travelling to work'. The system will learn from this when the user works and when they're likely to be home and commuting. This allows it to adjust its probability graph of work/other as shown in FIG. 4.

As the system learns, it can use the gradient of the graph to infer a commute and a flat to infer time at work or elsewhere—a distinction it can fine tune from other information.

This graph becomes therefore another input to the Context Engine; the steepness of the line is proportional to the probability that the user is commuting at a given time and therefore weighs on the calculations performed when determining the most likely contexts It is important to note that the Context Engine does not decide what content is relevant within a given context. It just provides an assessment of the likely contexts which can be used as inputs to the recommendation engine 10.

Moreover it is clear that no one sensor provides a definitive answer about any context. For example (the following is not an exhaustive list), being at work is determined by: time of day; previous days commutes bracketing a period of being roughly within a particular geofence; the presence of co-workers nearby; the identity of a work WiFi network being on holiday is a function of: a lack of calendar appointments; a period of offline time during a journey; a change in time zone; a change in sunrise/set times as judged by the ambient light detector; the absence of proximity to a work laptop being out with friends is a function of time of day; presence of friends' devices; movement constrained with a given geofence for a certain amount of time; your GPS data falling within an area containing entertainment venues rather than industrial units; frequency of tagged photos on Facebook etc. . . .

being about to go on holiday is a function of, lack of upcoming calendar items, presence of new PassBook items; a change in wake-up alarms booked.

In each case, the accumulation of evidence for a given context increases its probability, but no one piece of information decides a context definitively. The process is a best effort attempt that is fine-tuned by a comparison against anonymous data from other similar users and by user feedback and machine learning derived from this.

The processor 40 can execute a channel change detection algorithm when a viewer is "channel hopping" or "surfing". The aim of the channel hop detection algorithm is to determine when a viewer is looking for something to watch so as to detect this behaviour, so as to provide this as a piece of context. Details of the channel hop detection are given later.

The recommendation engine 10 receives context information from the context engine and based on their context information makes a recommendation for assets to be displayed at the user terminal 4. The recommendation supplies information about these assets to the API 8, which formulate a recommendation message for transmission to the user device 4. The number, content and type of asset vary depending on the context. The recommendation message comprises a sequence of asset tiles presented in a particular order. FIG. 5 is a schematic diagram of a recommendation message. It has a header portion which addresses the message to the consumer app 38. After the header, the message comprises a sequence of numbered asset tiles, Tile 1, Tile 2, etc., to Tile 5. There can be any selected number, n, tiles in a recommendation message. The order of the tiles governs the manner in which they are displayed to a user at the display 46. The app uses the order in which the tiles are received to control where on the display the tile is presented. Different examples of tile arrangements are shown later. The asset tiles can represent assets of different types. By way of example in FIG. 5 there are shown two video short form assets (VS), a new article a, another short form asset VS and a Twitter asset t. It will readily be appreciated that this is exemplary only and a very large number of possibilities are available for the recommendation message.

The asset tiles can include content identifiers as mentioned above. Alternatively, the asset tiles can include content itself, such as news overlay or descriptive text for a content item. Such content is displayed at the user device.

In addition, each asset tile includes a weighting which denotes the perceived importance of that tile to the user. The weighting also governs how the tile is displayed. For example, assets with a higher weighting can be shown in a tile of a larger size than assets with lower weightings. Weightings are not obligatory—it is possible to have a system in which weightings are not utilised, and wherein the display is controlled only by the order in which assets are received. Each asset tile further comprises information about where the client can obtain the asset. This could be for example an asset locator for accessing the asset server 6 to return a particular type of asset from the asset server. Alternatively it could be a URL identifying one of the content sources 14 to 22 which (as described earlier) are accessible directly to the user terminal 4.

A user can decide to "pin" a certain content item to a certain location, e.g. a weather update is always shown in the top right hand corner. This is managed in his user profile.

Figures 6, 7:
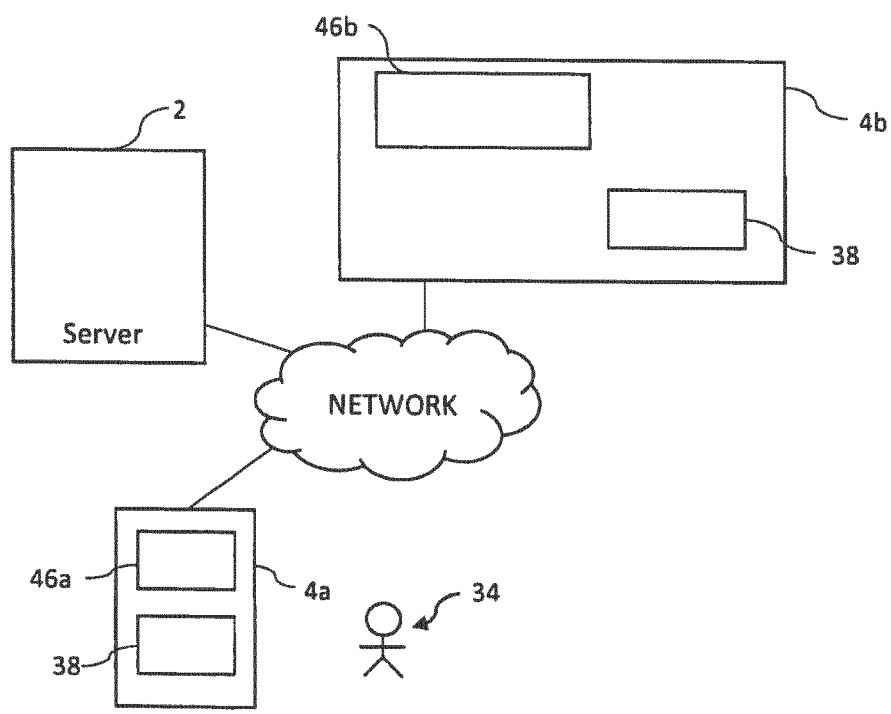
FIG. 6 is a schematic diagram of a tile in a recommendation message.
FIG. 7 is a schematic block diagram of two interacting devices.

FIG. 6 is a schematic diagram of an asset tile. In particular, it includes a tile ID which indicates the tile number (its place in the sequence). In addition, it can include a location ID. Note also in FIG. 6 that the type of the asset as indicated and the URL provides the asset locator.

As described later, the display component 50 presents at the user terminal 4 a settings panel so a user can configure their context parameters. For example, they could override tile placements to replace a video with a Twitter feed output (for example), or they could select topics as part of their settings. It could include a "more like this tile", and it could allow for reordering of the tiles on their display. Tiles could also be rearranged and resized by user input at the UI 49, in a manner emulating operation.

As mentioned in the introduction, the client terminal 4 has a responsive UI which changes the layout based on device resolution (phone and tablet) and orientation. Moreover, it can include a number of conceptual representations of video navigational layouts, for example, a grid where tiles are varied based on available screen space.

In addition, the system provides a different look and feel based on various context parameters including location, time, device and available time.

Reference will now be made to FIG. 7 to describe use of the configurability of the display on the user device 4 to allow the user device 4a to control another device. FIG. 7 illustrates a first user device 4a which can for example be a tablet or smartphone, or in any event something with a relatively small display as compared with a second device 4b. The second device 4b can be for example a TV or other large screen device, for example, driven from or incorporating a set-top box. Both devices run the consumer app 38. A network is shown by which the devices can communicate. The server is also shown connected to the network. It will readily be appreciated that the network is a schematic illustration of any form of communication system allowing the devices to communicate.

In this configuration, the companion device 4a can be controlled by a user in the following way. A set of assets may be on display at the companion device 4a. A particular tile format is presented to a user. This format can be mirrored on the display 46b of the second device 4b. Thus, a user can now see on his companion device and his larger device the same display format. The user can configure the format to his taste on his companion device by suitable user input (for example, with a touch screen he can change the size of tiles by gesture, or drag tiles to different locations). Once he is satisfied with the new configuration this can be uploaded to the second device 4b so that the new configuration is shown on the screen 46b. Then, the companion device can be reset into an independent mode whereby it can continue to recommend asset and content using its default display configuration, or another configuration selected by the user. The other device 4b will no longer follow the configuration once the user device 4a has been put back into an independent mode.

The recommendation engine is responsive to changes in context parameters provided by the context engine module 24 to update the content/layout of the tiles in real time based on time and location (and other context parameters). Thus, the display provided to the user at the user terminal 4 will change automatically depending on the time of day or the location where the user is, or in dependence on the user manually activating different settings of his context.

The recommendation message received from the control server 2 includes asset locators which enable the user terminal 4 to locate assets at the asset server 6 which are then displayed in accordance with order received from the control server 2. The approach supports tiles with initial choices for 4×4, 4×6 or a freely configurable number of tiles. The order is interpreted differently depending on the type of device. Depending on number and screen size governed by the display at the device 4, rectangle dimensions are calculated. A double-click on a tile which is empty by default points to a list of sources: Internet, social media, live TV, email, other. Email is a dynamic feed (reference 26) that pushes updates every ten minutes. The tiles can be made adjustable in size by the user using two fingers.

It is intended that the size of display of the asset will be equivalent to the importance to the user, as governed by the context parameters driving the recommendation engine 10. This is controlled by the weightings 10.

The context engine learns from and considers the user behaviour to modify and to optimize the recommendation. Here different "inputs" (device, time, location, . . . ) are used to detect in what situation the user currently is, finally to set the best recommendation and to configure the actual experience.

The user sub profiles can allow the user to set the situation by himself to get the correct recommendation related to his mood/situation/general preferences but also to set general no-goes.

A user profile could define generally what someone likes and would get recommended but perhaps more important what someone doesn't want to see at all (violence, pornography, soap operas, . . . ). A user sub profile could also have the ability to allow to define different preferences related to the current situation.

Actions which a user takes when they are using one of their sub profiles does not affect recommendations when using another of their sub profiles, unless they specifically request that the sub profiles are modified together.

Note that the server updates any of the users/connected devices of a given profile if just one of them senses a different context. If a user carried their smartphone and their tablet, but only the phone detects a change in context, nevertheless that change in context can be updated also for the tablet. When the user starts using the tablet, the context is updated on that device as well, and also for example, on the television at home.

Notwithstanding this update, note that all the devices could show the same or different content depending on the settings on each device.

Consider somebody

Who is on vacation where he might have real different interests and focus compared to his Monday morning week start—when he usually have to get the train at 7 am Who is on sick leave so that he also want to get more entertainment but simultaneously has to get updates related to his work to a certain extend Who has a user subscription that is usually used by the whole family so that kid content is one of the main requests—but perhaps sometimes he is also using this profile just for himself so that he don't want to get the usual "family preferences recommendation" but something different . . . .

An important feature of the app is to have the capability of general settings, that have direct applicability to the profile but also to have sub-profiles to select by the user that consider different situations where a user has different preferences. All this helps to optimize the recommendation and to speed up the learning process of the recommendation engine but also supports the recommendation and the respective learning process to focus on the right spot/situation and not to get distracted and interfered with by the fact of "different preferences" at different situations which are not already being detected by the several input mechanisms (shown in FIG. 3).

Figure 8:
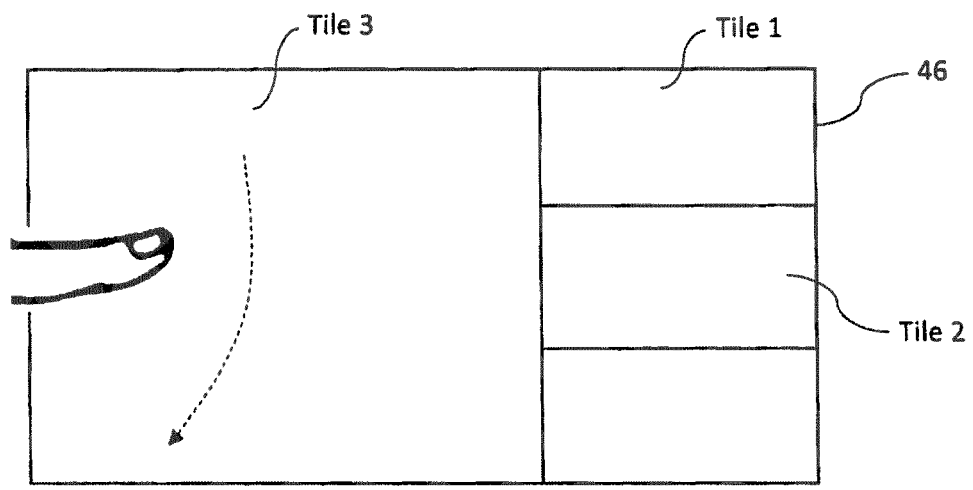
FIG. 8 is a schematic block diagram showing swipe control.

Reference will now be made to FIG. 8 to show a method of volume control in the tile-based display. FIG. 8 shows a display 46 of a user device. The user device has audio output means, such as a loudspeaker, which is now shown in the Figure but can be of any known type. 4 tiles are shown in FIG. 6, Tile 1, Tile 2, etc. each displaying an asset. At least one of these tiles is displaying an asset with volume, in this case, Tile 3. A user can control the volume of an asset by swiping using his finger as shown in the diagram by the dotted arrow. In the embodiment, a downward swipe denotes that the volume of the audio signal generated related to that tile should be reduced and possibly muted. Alternatively, an upward swipe could indicate that the volume of that tile should be increased and simultaneously other tiles muted.

Each asset can have its volume independently adjusted—there may be multiple audio output streams running simultaneously.

There follow examples of five user stories.

User Stories

Story 1—Lunchtime Viewing of Short-Form, Linear News and Social Content

Whilst at work. Mark has 30 minutes to browse the Internet in his lunch. He is interested in a short-form content appropriate to his work environment. This means being recommended short-form new items (both VOD and linear), possibly based on trending topics derived from his Facebook and Twitter fees. Additionally mark will want to watch the typical "kitten" videos we all share in the office.

The application can do this as it knows that Mark is at work and it knows that Karl takes a 30 minute break between 1 pm and 1.30 pm.

Story 2—Breaking News Item

Whilst Leigh is using the U-TV 38 to browse content in his evening, a fire breaks out down town and a breaking news article trends within his Twitter feed. The U-TV 38 will now update his display to include, trending twitter posts for #firedowntown hashtag
Vine video's tagged with #firedowntown hashtag
Facebook feed with the #firedowntown hashtag
a selection of local news streams
possibly additionally promoting some premium fire-related film (Backdraft, for example)

The system can do this as it integrates with Twitter and Facebook and assesses trending news articles, keywords in news articles can be additionally used to "find" associated video and VOD content based on content tagging. Additionally the system has a hook in to Leigh's social graph and can additionally promote items based on his specifics (as in his user profile), Story 3—Evening Viewing Focussed on Long-Form Content Discovery Kevin is wanting to watch television at home and loads the U-TV app to discover some content. The system knows that Kevin is at home and that Kevin likes to watch long-form content of an evening.

The system will promote VOD content based on Kevin's previous viewing habits. The system will include trending VOD content but will not include Twitter, Facebook or any other non-video content. The system can do this as it knows that Kevin is at home and that Kevin watches films on Monday evening.

Story 4—Evening Viewing Focussed on Short-Form and Social Content

Sian likes to use U-TV whilst she is watching television at home on an evening. She is mostly focussed on the television but the television programming does not require her undivided attention and she casually browses U-TV to spot any short-form and social content that can complement her casual approach to watching television on an evening. The U-TV app listens to the television programming and promotes content based on her television programme at that time. This can be achieved where the TV feed is supplied as a content source for matching purposes.

Story 5—Evening Viewing Focussed on Short-Form/Long-Form Sports and Social Content Peter enjoys watching any sport in the evening although he is relatively indiscriminate in the sport that he wants to watch. He uses U-TV to surface linear streams running sports and will "zoom" in on a game when the action interests him. However, Peter is also a social hound and knows that his friends know when something great is happening in a game. U-TV displays a good mix of sports content based on Peter's preferences but additionally a tile maintains a list of sports-related content that is trending and his friends twitter posts are surfaced higher than public posts.

The application can do this as it knows that Peter is a sports fiend, especially on an evening, and he is really looking for the good bits of a game. This means short-form and highlights or a chance to jump to the hot part of a game when his friends tell him to.

There follows a description of three use cases:

Case 1

Figure 9:
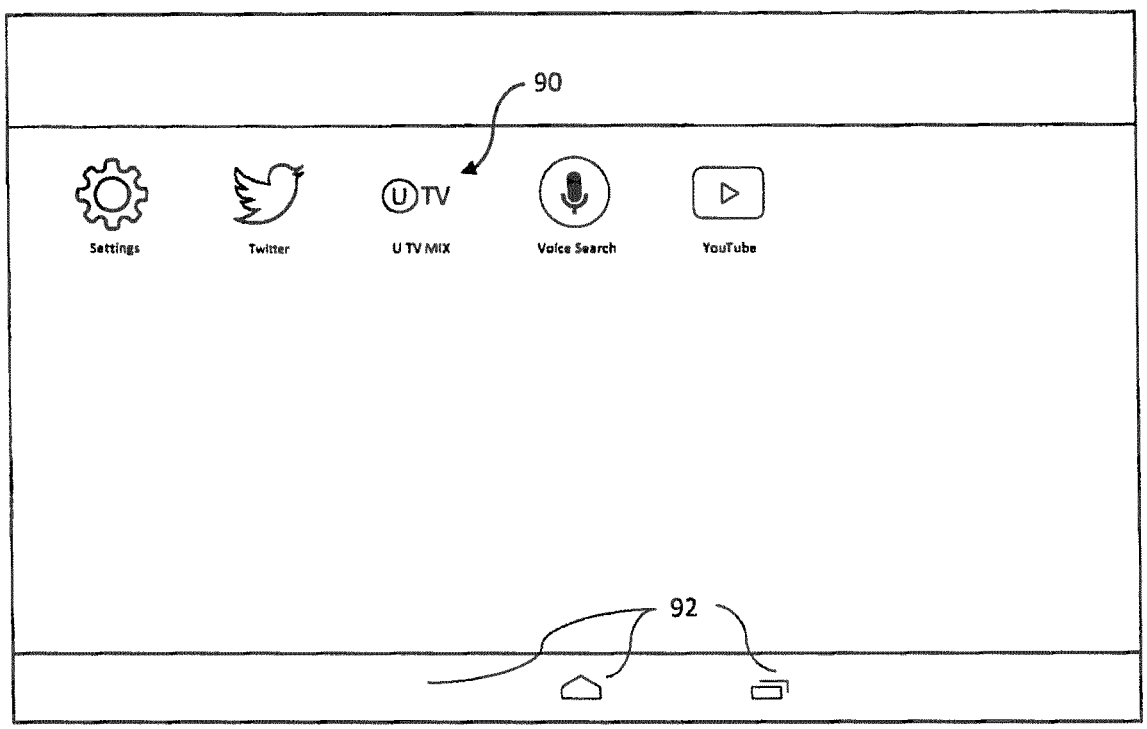
FIGS. 9 to 29 show screen shots of different use cases.

Start the application by entering into the android menu and selecting the U TV MIX icon. FIG. 9 depicts the application menu page. The U TV MIX application is started by selecting the U TV icon 90. At the bottom of the figure are the navigation buttons for the device 92.

Figure 10:
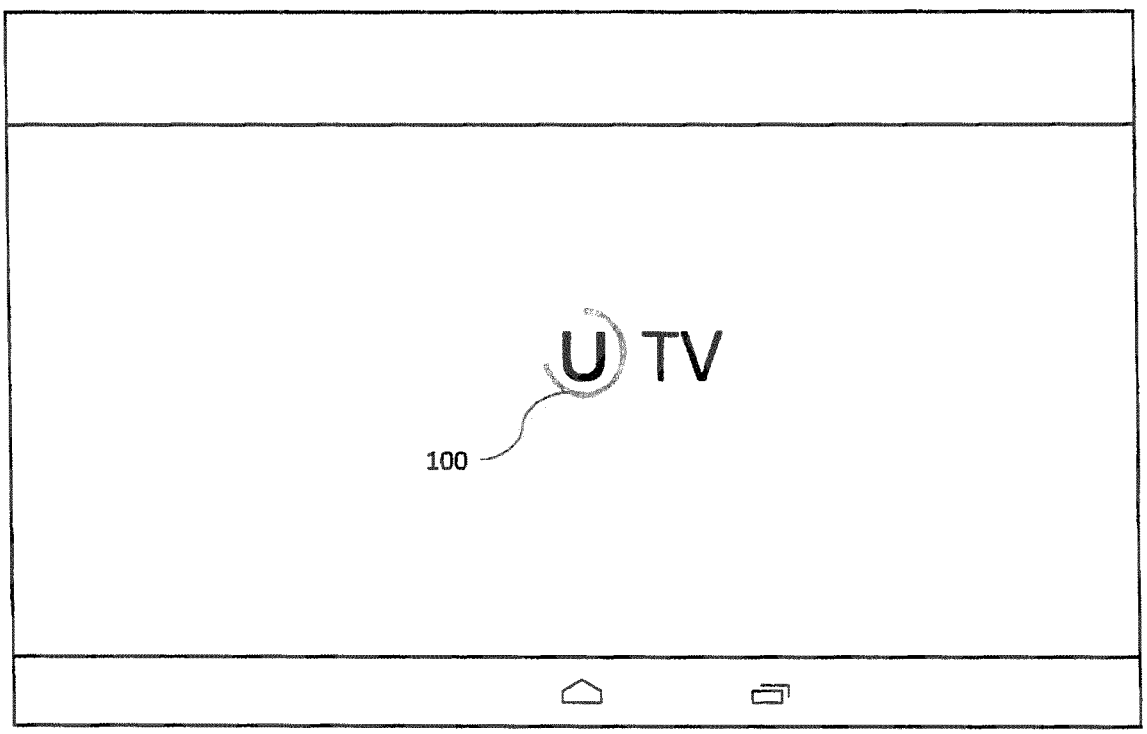

After selecting the U-TV MIX icon 90 the user is met with a loading screen, FIG. 10. While loading the blue ring around the 'U' 100 appears in a clockwise rotation from the 12 o'clock point.

Figure 11:
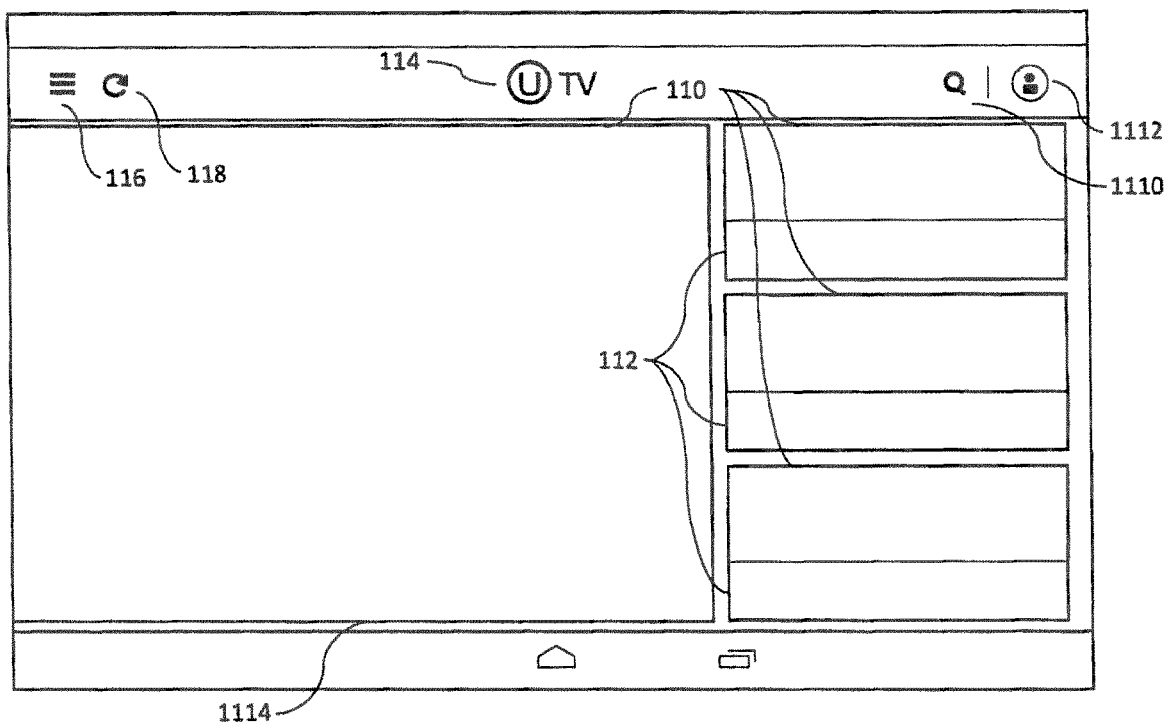

The 'Trending Topics' page is then displayed, FIG. 11. The trending topics presented depend on aspects of the user's personality. This personalisation is achieved by gaining information through various sources such as Twitter feeds, Facebook feeds, user's location, time of day at that location, etc. Images are shown to represent the available topics of interest 110. The images displayed are not moving, they are representative still images. Each image has a partially transparent section at the bottom 112, where the title of the topic and a small summary of available content can be seen. At the top of every page within the application, the U TV logo is displayed 114.

Figure 12:
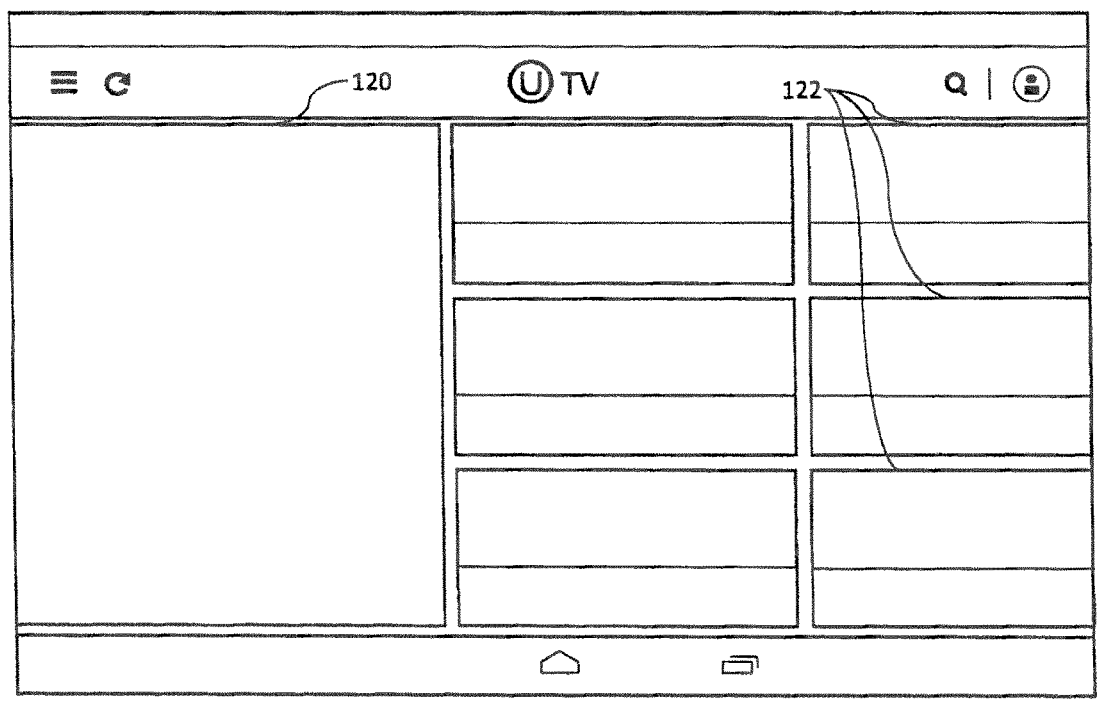

More topics can be found by scrolling to the right, as shown in FIG. 12. The number of topics potentially visible has not been defined. It is 7 here for editorial purposes only. In FIG. 12 the main topic of interest has moved partially off of the screen to the left 120, and three new topic images have moved into view on the right 122.

Figure 13:
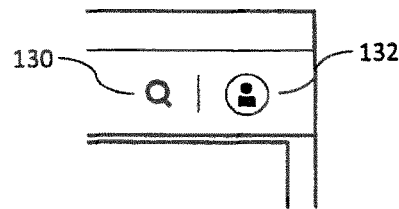

FIG. 13 shows the top right-hand corner of the page. This is where the 'search' button 130, and the 'settings' button 132 are located.

Figure 14:
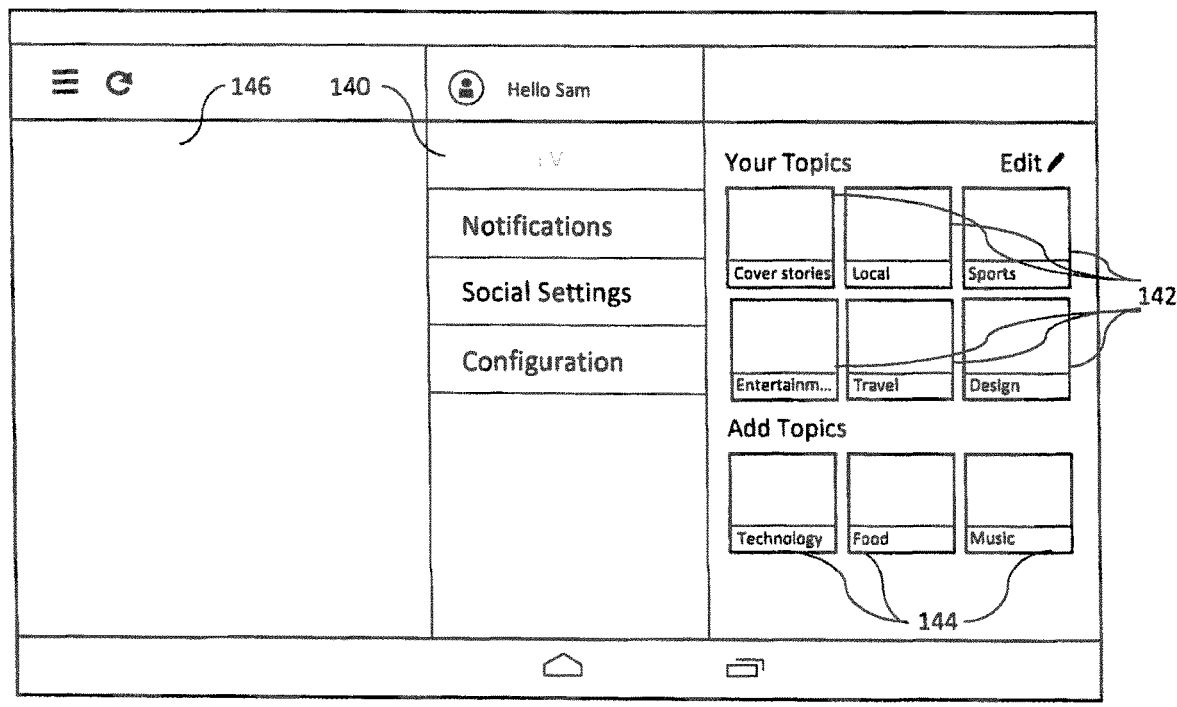

Clicking on the settings button 132 takes you to the settings page. The initial section of this is the MY U-TV page. Here the user can select certain topics of interest allowing the further refinement of the metrics used to build the trending topics. FIG. 14 shows the settings menu displayed when on the 'MY U-TV' section 140. The right-hand panel depicts the topics you are currently interested in 142, and a selection of further topics you may wish to add 144. While this menu is open, the left-hand panel of the screen becomes a partially transparent black, with the trending topics page visible through it 146.

Figure 15:
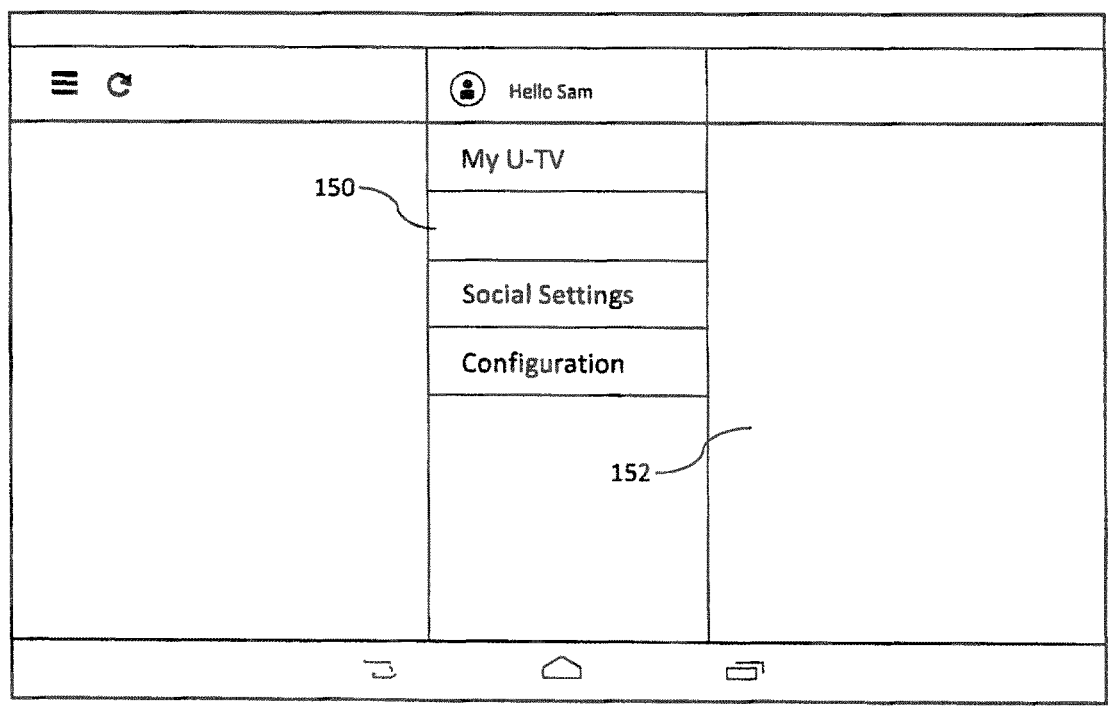

FIG. 15 shows the display after the 'Navigations' section has been selected from the settings menu 150. The right-hand panel shows notifications regarding newly available topics and updated content of current topics 152. The notifications page is intended to provide the user with alerts when new topics and new articles become available. The user will have some choice over these, for example 'I only want to see a maximum of 10 at any one time'.

Figure 16:
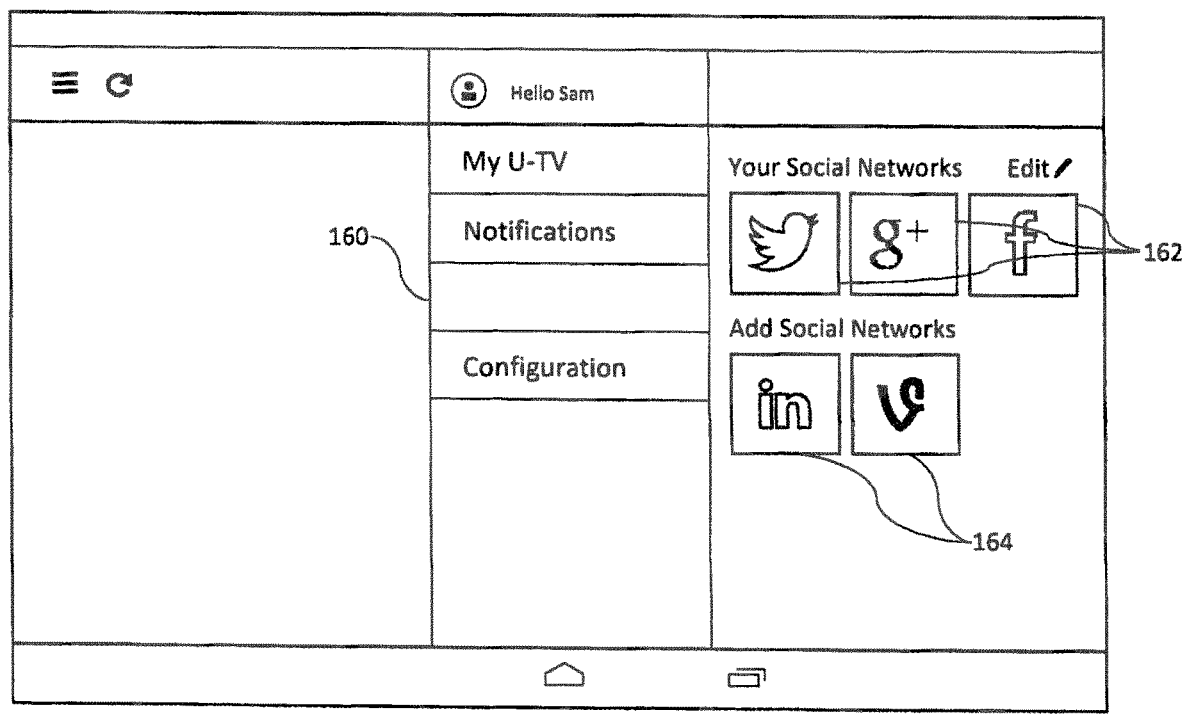

The Social Settings section is where a user logs into their social networks. It is intended to have the user also log into news sources e.g. Huffington Post, BBC News, Google News, etc. in order to pull in news articles. FIG. 16 shows the display after the 'Social Settings' section has been selected 160. The right-hand panel shows the social networks the user is currently logged into via the application 162. Bellow this other social networks that have not yet been signed into are suggested to the user 164.

Figure 17:
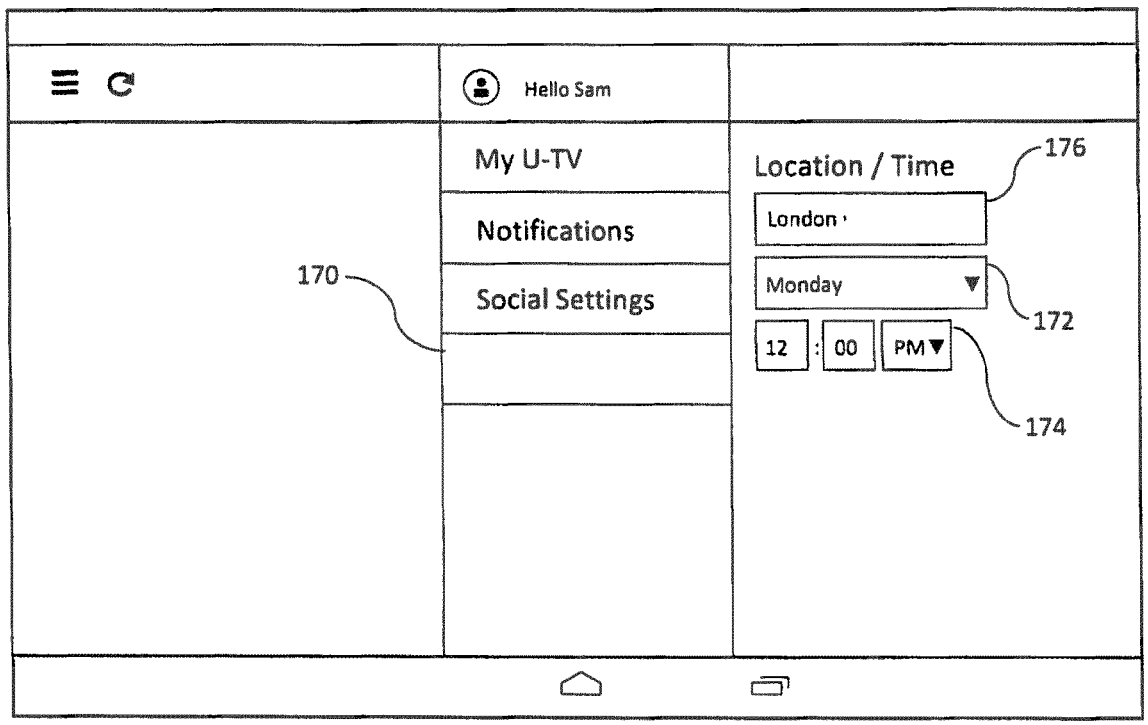

The Configuration page is the 'Cheat Key' for use in the PoC. Allowing demonstration of how the applications trending topics change when the user is at work/home, in another city/country, the weather is good/bad, etc. FIG. 17 shows the display after the 'Configuration' section has been selected 170. This section has been enabled for setting the day 172, time 174, and location 176 of the user.

Figure 18:
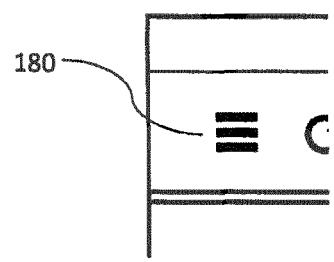
Figure 19:
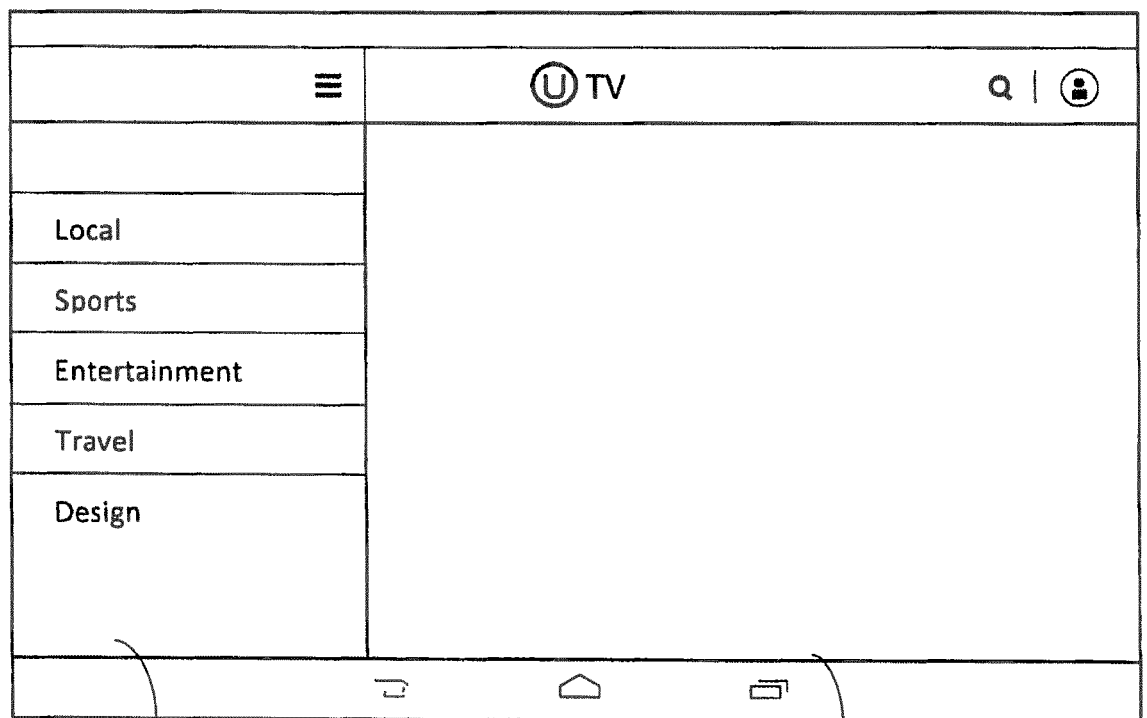

Going back to the Trending Topics page, FIG. 11, in the top left-hand corner is a hamburger menu button. FIG. 18 shows the top left-hand corner of the display, where the 'menu' button is located 180. This menu provides the user with a slightly different way of refining the trending topics. FIG. 19 shows the display after the 'menu' button 180 has been selected from the trending topics page. The left-hand panel shows a number of options to further refine the trending topics 190. The right-hand panel now shows the trending topics through a partially transparent black hue 192.

Case 2

Begin by loading the application as before, seeing the standard loading page, the user is then presented with the Trending Topics page, as shown in FIG. 11. The 'menu' 116 and 'refresh' 118 buttons can be seen in the top left-hand corner, the 'search' 1110 and 'settings' 1112 buttons in the top right-hand corner.

Figure 20:
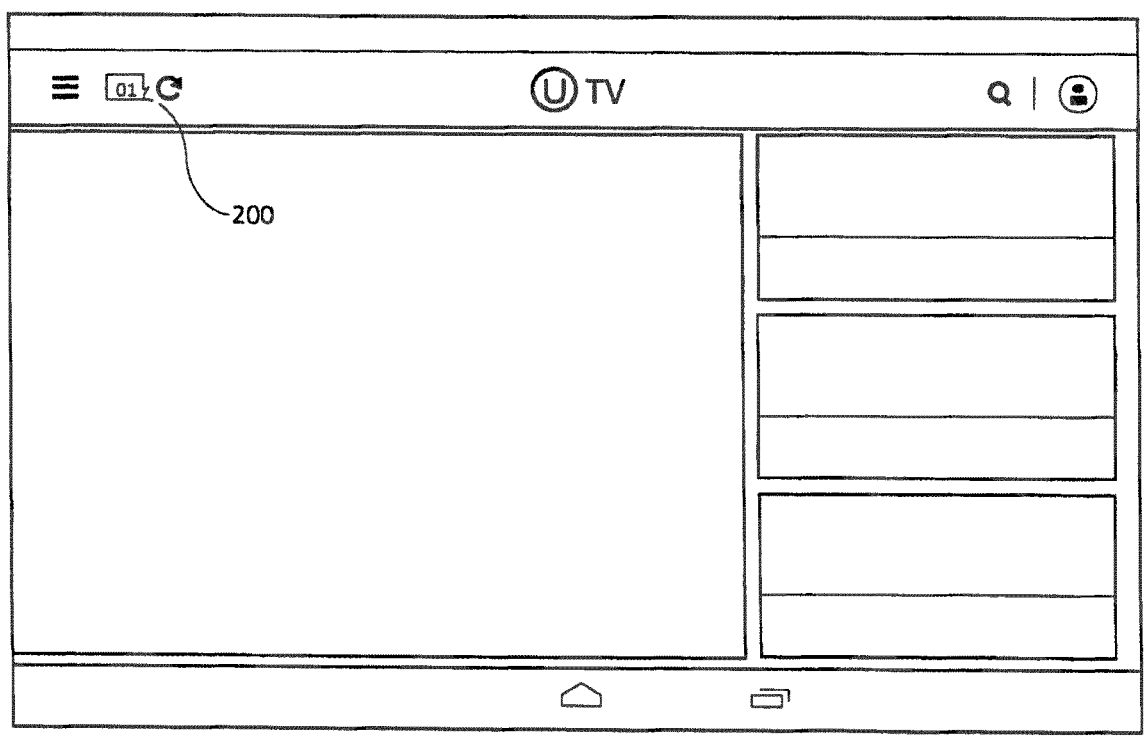

A significant news story breaks, and the topics available are updated. The user is notified of this by the appearance of a small blue notification next to the 'refresh' button in the top left-hand corner of the screen. There is a single notification, therefore the number shown is 01. FIG. 20 shows a notification being received following a breaking news event. The notification appears next to the 'refresh' button 200. The notification signifies a new topic becoming available.

Figure 21:
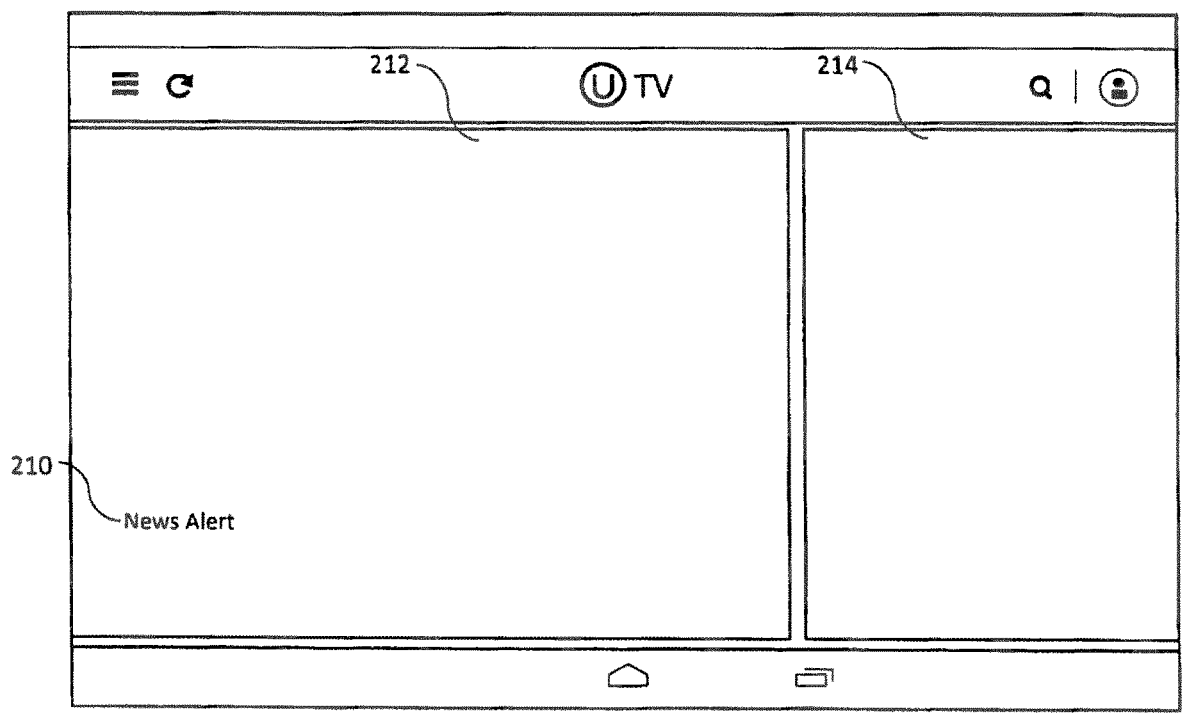

Clicking on the notification updates the Trending Topics page and the new topic is inserted into the page with a 'News Alert' 210 highlight on it to grab the user's attention. FIG. 21 shows the display after the page has been refreshed to include the new topic. The new topic 212 is now displayed to the left of the previous trending topics 214.

Figure 22:
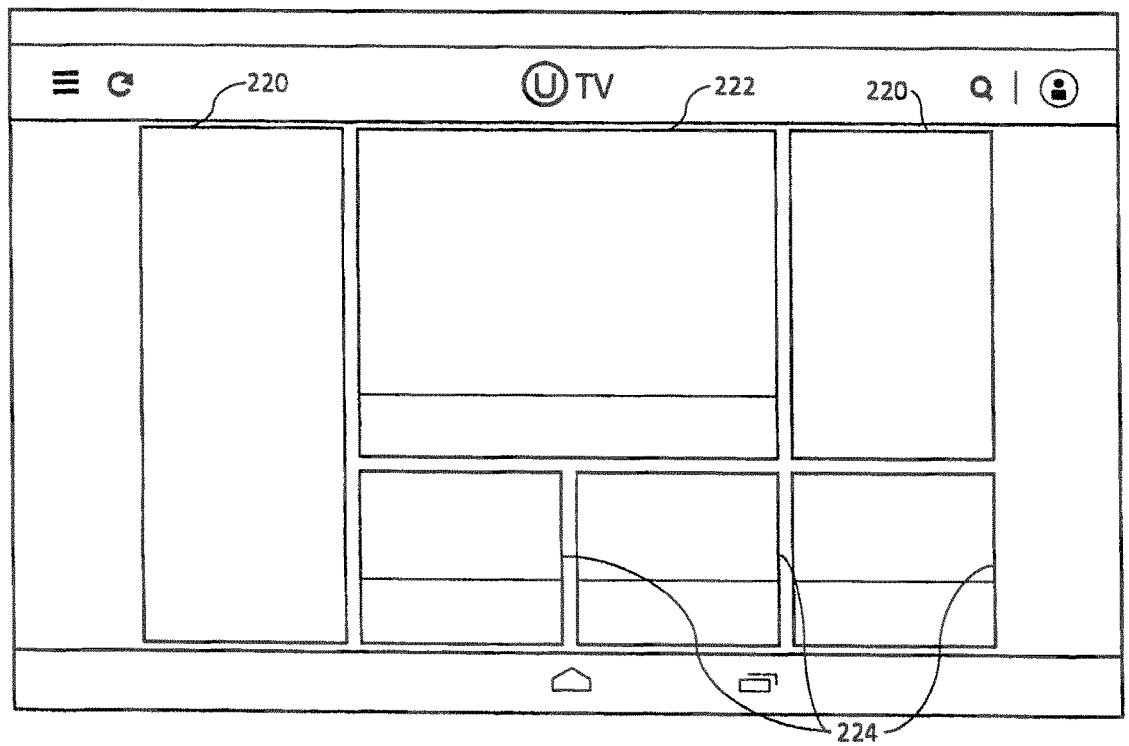

Clicking on the new topic brings up the tile display for that topic, as shown in FIG. 22. The tile display shows both videos and articles related to the news event, pulled from a number of different sources. These include You Tube videos and live broadcasts. Twitter feeds, Facebook feeds and News feeds have been configured to pick out specific news. The videos play continuously, the photos in the articles are still images. The left-hand and top right-hand tiles 220 show news articles related to the event. The central three and bottom right-hand tiles show videos related to the topic. All video content is playing concurrently. The larger video is a live news stream 222. The three smaller videos are YouTube videos 224.

Figure 23:
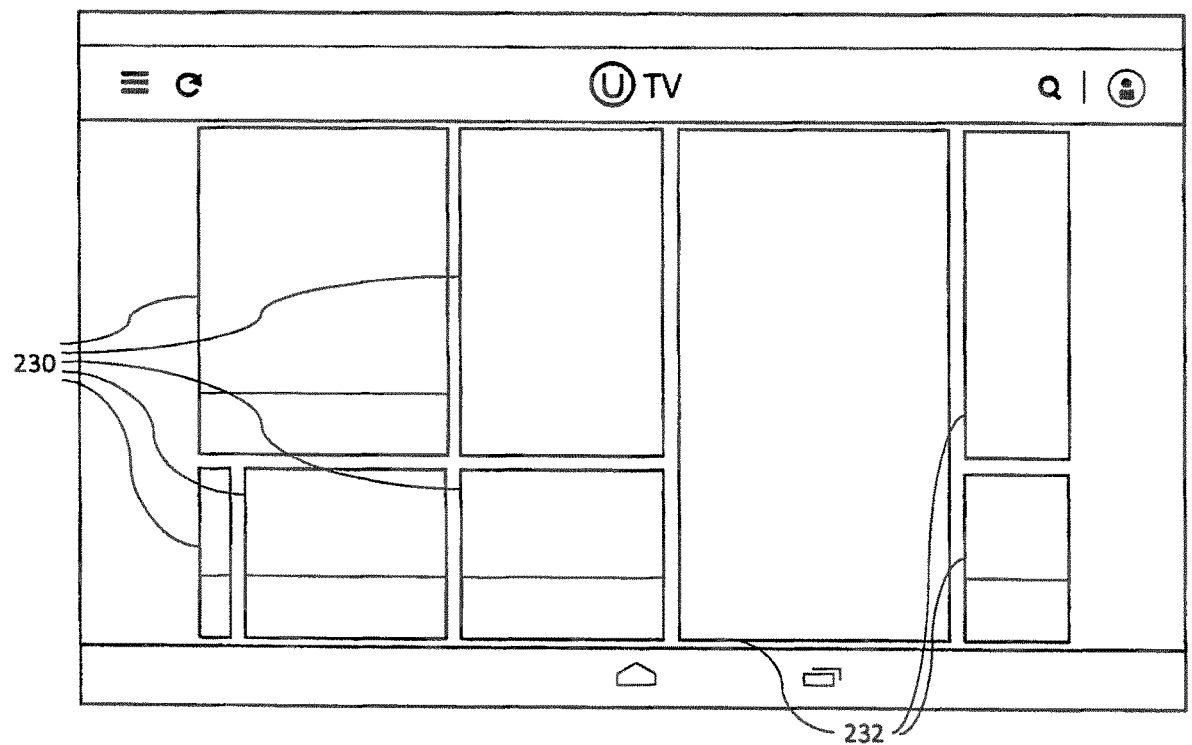

Scrolling to the right brings more content into view. FIG. 23 shows the tile display having been scrolled to the right to show more available content on the topic. The previous videos and article 230 making way for two more articles and another video 232.

Figure 24:
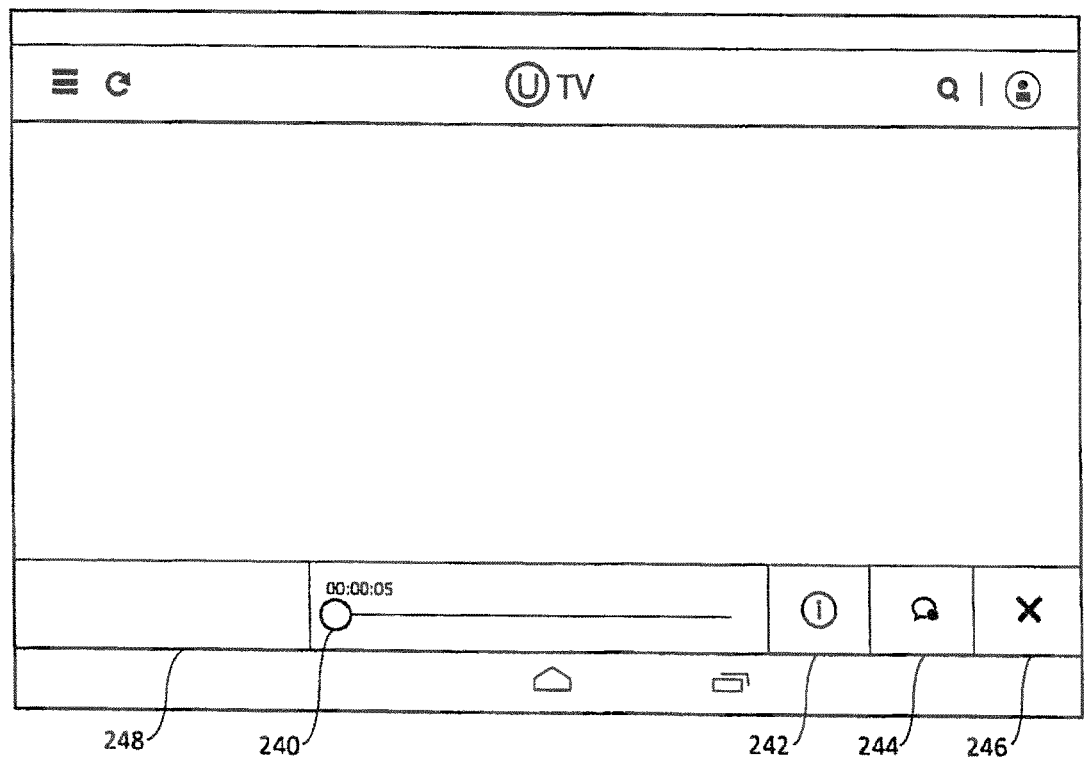

Scrolling back to the left and clicking on the largest video tile 222 with the heading 'Wildfires in Southern California . . . ' takes the user into a single item view to watch the linear stream of this video. FIG. 24 shows the display having selected the video tile. The video now fills the screen. A bar at the bottom provides the user with a 'click and drag' button 240 for navigating through the playing video. On the right of the bar are an 'information' button 242, a 'conversation' button 244, and an 'exit' button 246. The space on the left of the bar can be used for advertising 248.

Figure 25:
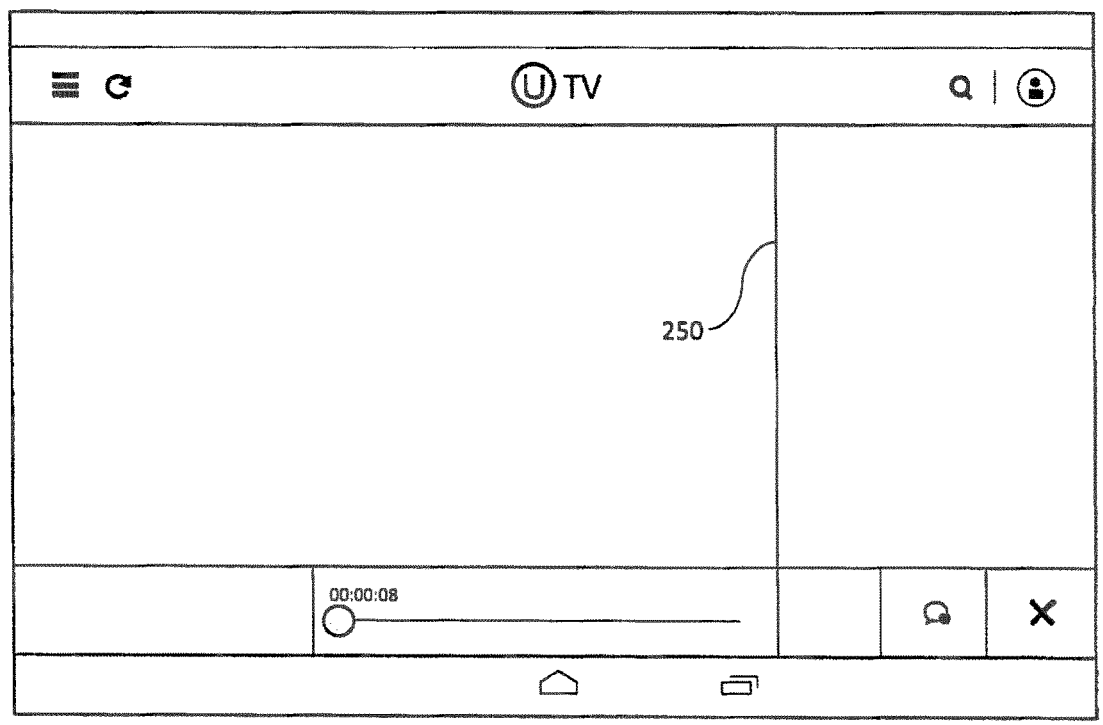

Clicking on the 'information' button 242 or the 'conversation' button 244 brings in associated content. The 'information' button brings in an informative description to accompany the video. FIG. 25 shows the display after the 'information' button has been selected. A panel on the right of the screen shows a description of the content being viewed 250.

Figure 26:
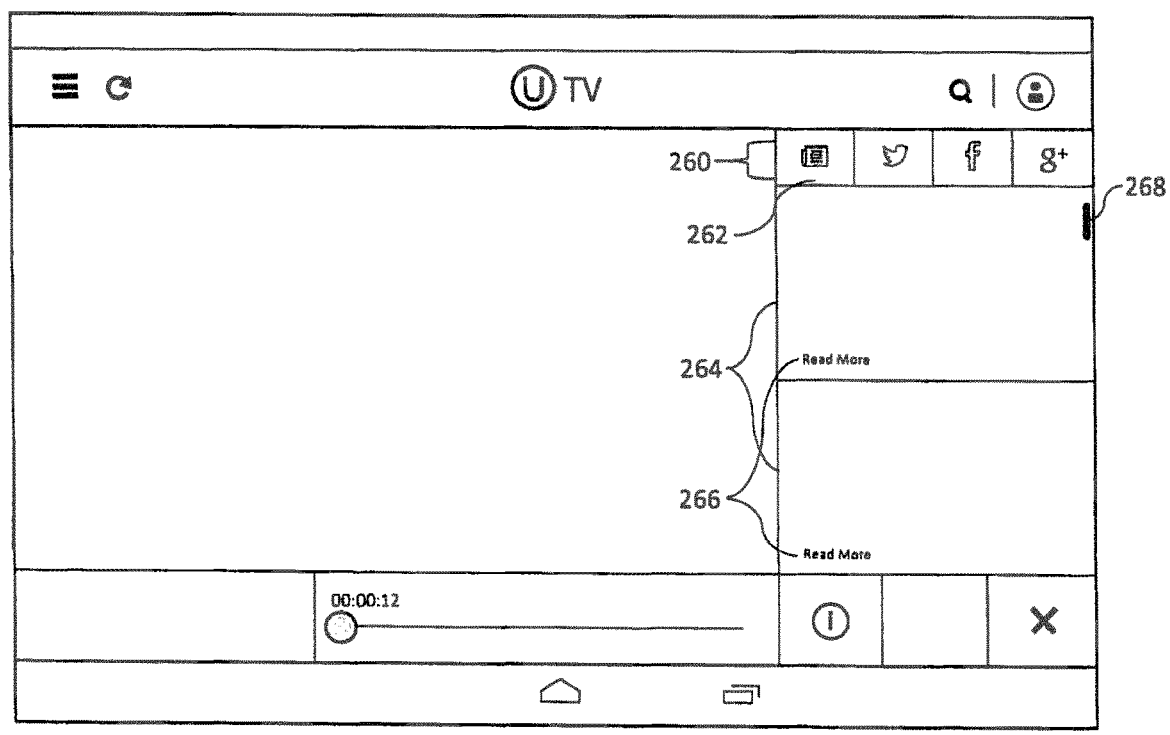

The 'conversation' button provides the user with a selection of feeds associated with the video via news sources, Facebook. Twitter, and Google plus, etc. The user can scroll down to display more items. FIG. 26 shows the display after the 'conversation' button 244 has been selected. A panel to the right now shows a number of selectable sources of associated content along the top 260. The news feed option has been selected 262 from the four shown, and there are two news articles displayed in the panel 264. Each gives the choice of reading more of the article 266. A bar to the right of the panel shows the option to scroll down to see more articles 268.

Case 3

Begin by loading the application, seeing the standard loading page, FIG. 2, and then being presented with the Trending Topics page, FIG. 11.

The user then selects the World Cup topic 1114. The tile view of this topic is then presented to the user, shown in FIG. 27. This comprises of concurrently playing video streams and articles, each individually displayed within a tile. The video content is a mixture of live and VOD. The news article has been pulled from Google news. The top left-hand tile shows a live television stream 270. The three tiles along the bottom 272 show short videos like adverts and YouTube clips. The top right-hand tile contains a news article 274. Scrolling to the right brings more concurrent streams into view, FIG. 28. The newly visible videos are 6 short-form videos from You Tube, playing concurrently 280.

Twitter and Facebook content has not been brought in-line at this point. This has been left until the user has selected a specific item of content to view. Though Twitter and Facebook are being used to decide tile content. The live Brazil vs England feed is selected to be viewed by the user 270. The video fills the screen and a bar appears at the bottom as described in FIG. 24.

Selecting the 'information' button 242 in the bottom right-hand corner brings up a description of the video being watched, including live score. FIG. 25 shows the display after the 'information' button has been selected. A description of the video appears in the right-hand panel 250.

Figure 29:
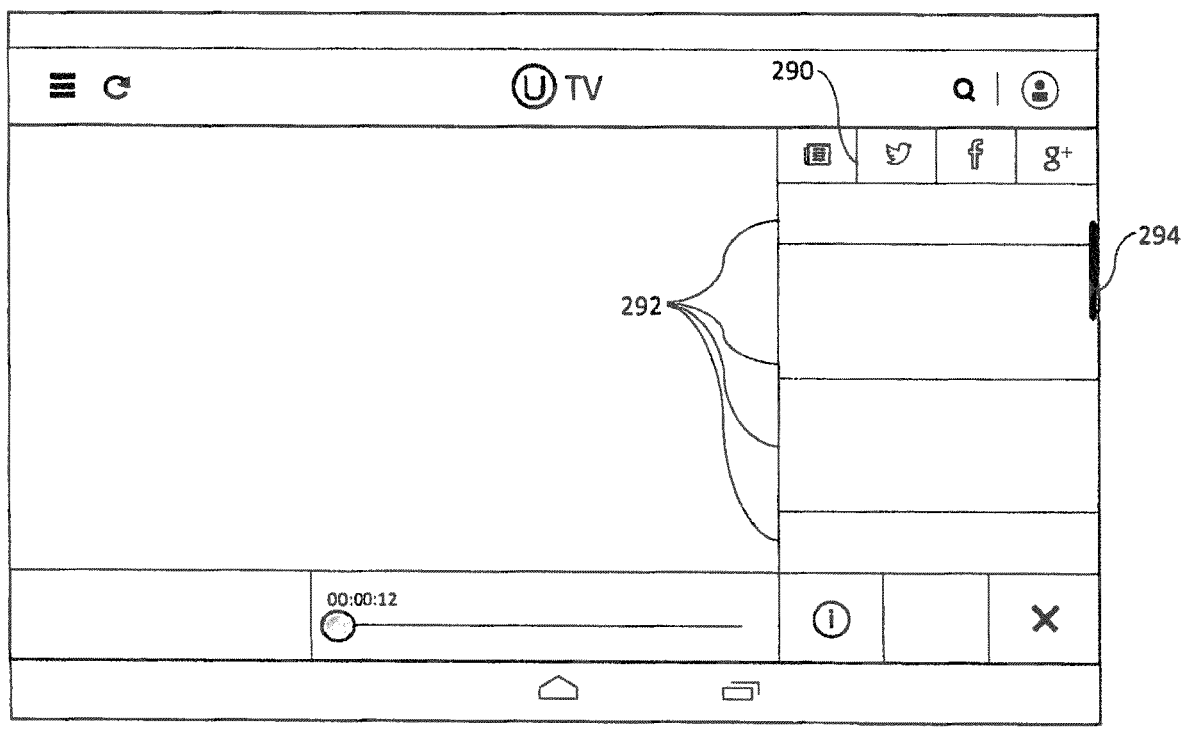

The 'conversation' button 244 allows the user to view content from news feeds and social media feeds as previously shown in FIG. 26. FIG. 29 shows the display after the 'conversation' button has been selected. The twitter feed option 290 has been selected from the four shown along the top 260. There are parts of four posts displayed in the panel 292. A bar to the right of the panel shows the option to scroll down to see more posts 294.

Clicking on the 'conversation' button 244 again removes the screen section displaying the feeds. The display is then as shown in FIG. 24.

Figure 27:
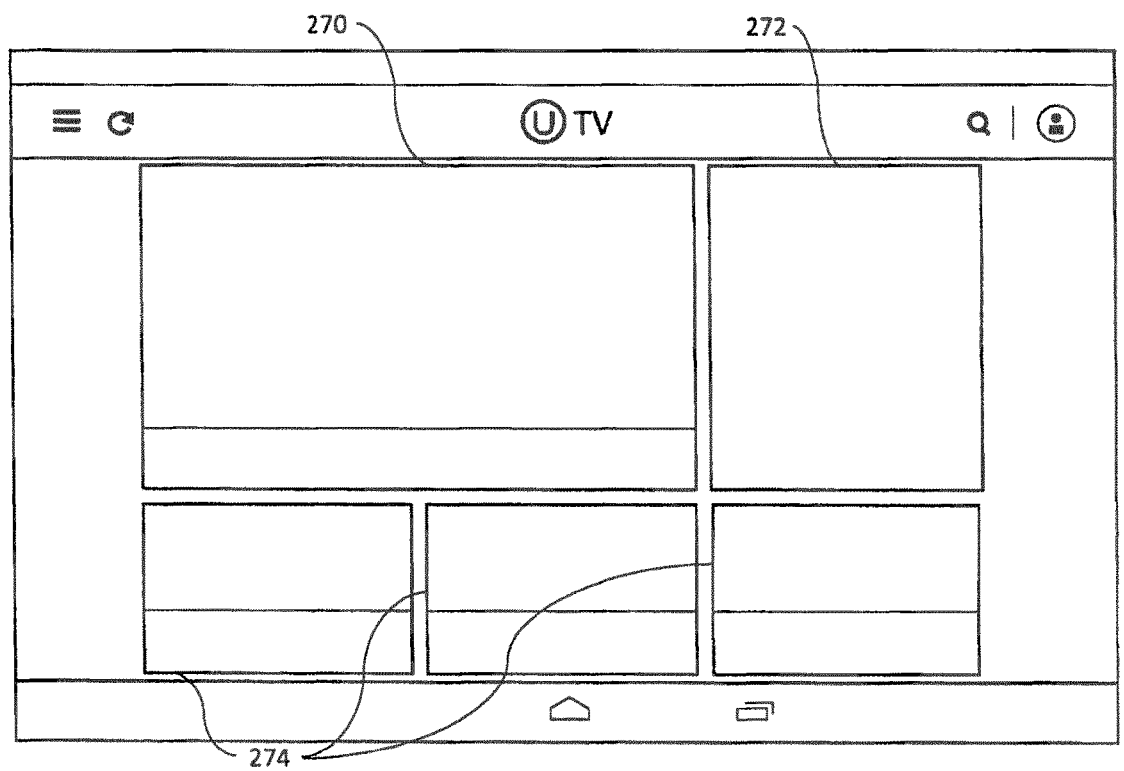
Figure 28:
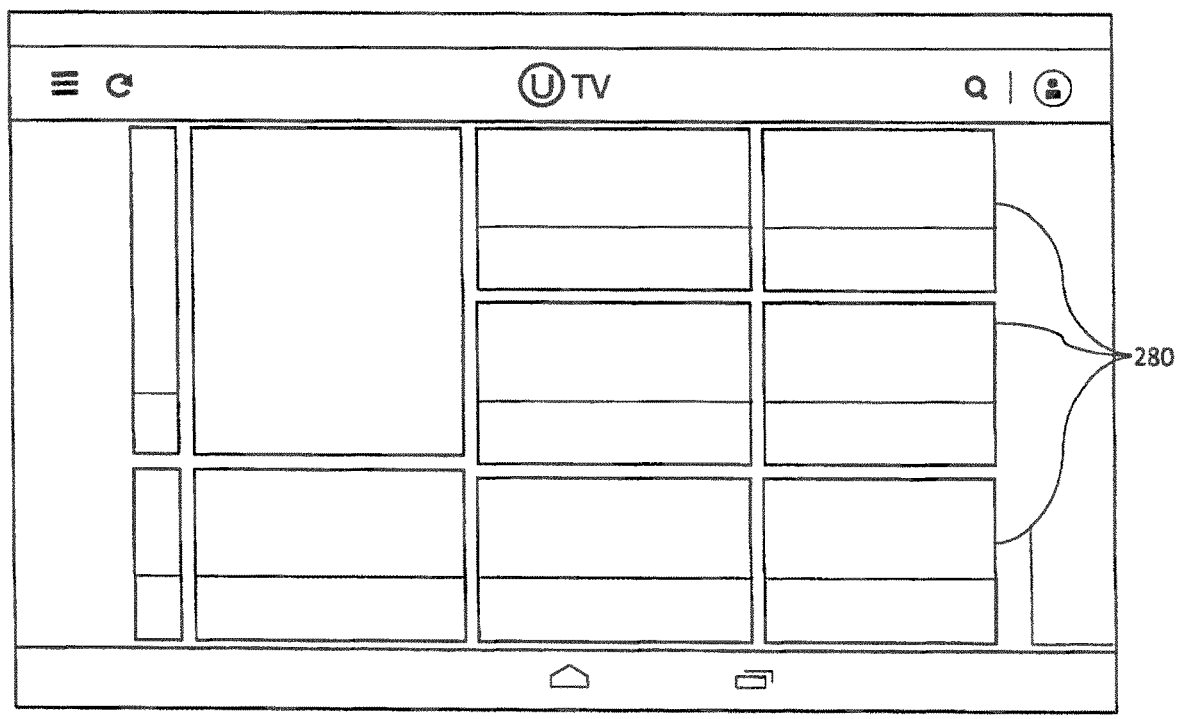

The 'exit' button 246 is then selected, and returns the user to the tile view for the previously selected World Cup topic as shown in FIG. 27.

The following sets out information about the API 8. Each table has a heading which describes the function of the API:

Trending topic
Recommendations and lists
Social feed

Each function can be activated at an endpoint which is defined in the table. Note that for recommendations and lists multiple endpoints are possible and this has been separated into two tables, one table relating to recommendation and list of articles, and the second table being related to recommendations and lists for video assets.

When the function is implemented, the response is determined by the function name (action) and the defined endpoint.

Below the table of "Trending topic" are exemplary response items, each having a corresponding tile id equal to 1, 2, 3, 4.

Below the "Social feed" table a sample response lists a number of different articles from the source "article" and postings from the source "Twitter" all sharing the subject content "Tracy Morgan". Note that the items returned from the source "article" have a specific URL associated with them to allow the user terminal to access these articles from the article asset server itself. Postings from the Twitter source which are returned in the response do not have a separate URL—instead they are taken directly from the Twitter source to the user terminal, Below the table "Recommendations and lists" is an example response containing an array of recommendations tiles, each including a video URL and information about how the tile is to be presented at the user terminal.

Channel Hop Detection as Context

The inputs to the channel hop detection algorithm are channel change events. When the channel hop detection algorithm detects that the channel change pattern matches a typical channel hop behaviour, the output from the algorithm takes the form of a data transmission control signal which is used to trigger the surfacing of recommendation data suitable for the viewer. The channel change events can be supplied to the channel hop detection algorithm in any suitable manner. For example, the user device can be capable of audio content recognition (ACR), or it can receive signals directly from a television or a channel controller 6 which changes channels. It will readily be appreciated that in this context, the television encompasses any kind of viewing device, and in particular, encompasses a set top box associated with a screen. In that case, signals could come directly from the set top box.

Fewer presentations of recommendations when the algorithm is surer about the situation are more valuable to a user than more presentations when it is only partly sure of the user's behaviour. This is achieved by comparing the current channel change event activity with a behaviour for that viewer. To this end, the algorithm uses feedback based on the user actions responsive to the recommendation data to "learn" the viewer's habits. The algorithm uses the viewers' habits to refine its accuracy over time. It is possible for it to begin with a so-called "cold start", that is, without any initial data, or with a sample profile chosen by the system from a stock of existing profiles, as described in more detail below, or from a fixed starting point which is then refined over time.

Feedback from the user concerning the recommendation data can include understanding which recommendation options have been displayed and which of those options have been ignored or selected. If recommendation options are ignored, it can be assumed that this was not a good point in time to trigger the surfacing of recommendation data to a user. If they are selected, this conversely will indicate that that particular channel change behaviour represented a good trigger point for surfacing recommendation data.

The channel hop behaviour itself, can form part of useful analytical information to be dispatched as context. The feedback from the user related to whether or not they are really in a "surfing condition" (channel hopping mode) helps to adjust the trigger point (point of detection) more and more precisely individualised for the user's benefit. This is one advantage of allowing user feedback to be taken into account by the app. Additionally, this kind of feedback is useful to gather more personalised information about the analysis of channel hopping itself.

Channel hop behaviour can be user specific or device specific. That is, behaviours for comparison in the algorithm can be associated with a user identifier or a device identifier (or both).

Figure 30:
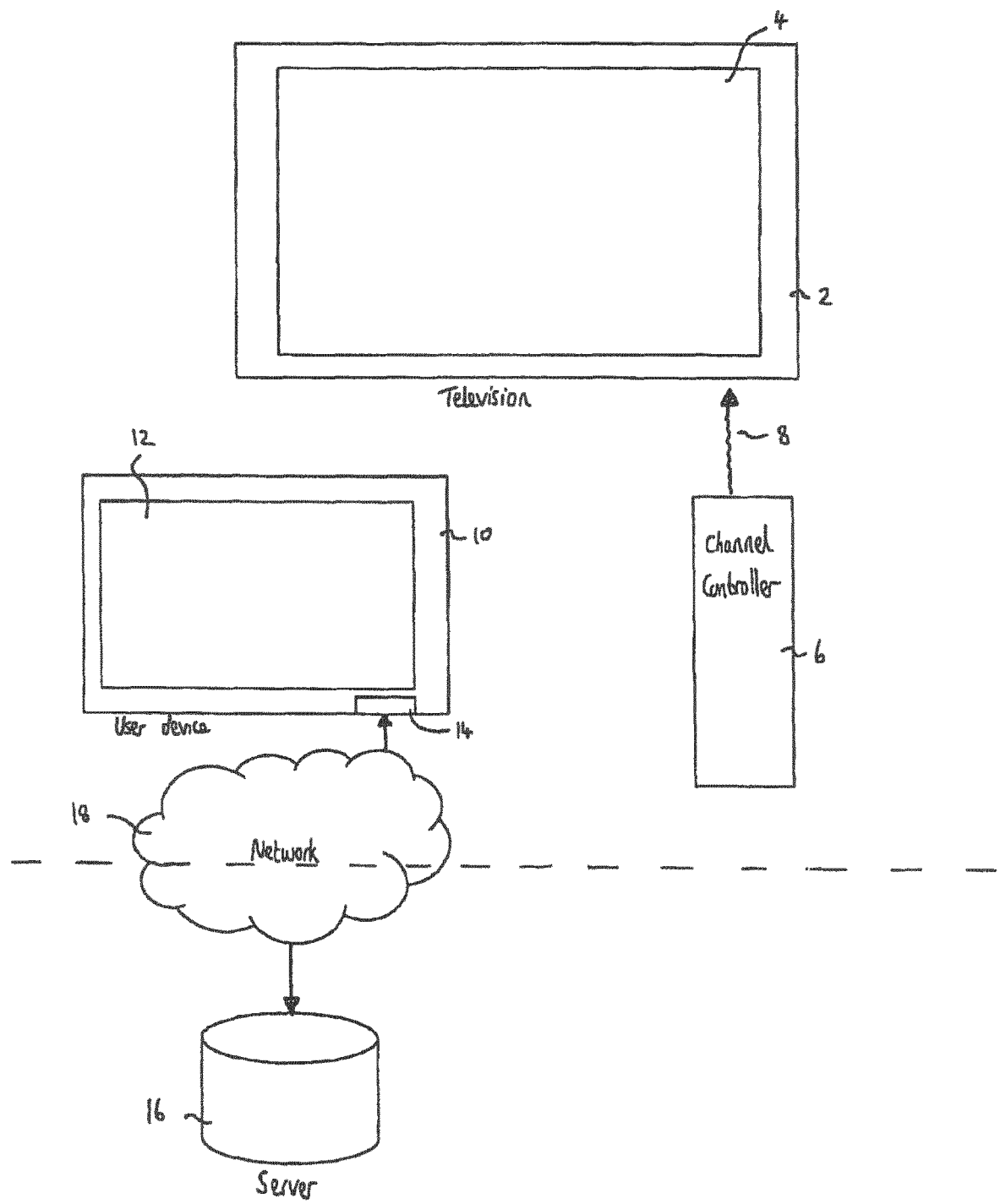
FIG. 30 is a flow chart illustrating operation of a channel hop detection algorithm.

FIG. 30 is a flow diagram 400 illustrating the main process steps performed by the channel hop detection app.

The channel hop detection app is launched on the user device at step S402 ("start").

After the channel hop detection app is launched on the user device, the process proceeds to step S404 (clear channel hop counter) by 'zeroing' or resetting a channel hop counter. The channel hop counter keeps track of how many times the viewer has channel hopped. A channel hop is defined as the act of changing from one channel to another channel shortly after a previous channel change. Precisely how a channel change is determined to be a channel hop is explained later with respect to FIGS. 31 to 33.

During normal operation of the channel hop detection app, the user device may constantly attempt to detect a TV programme currently being watched using Audio Content Recognition (ACR). A feature of ACR is that it also provides information about the current TV channel periodically, even if the channel has not changed. At Step S406 (detect TV channel change), the channel hop detection app detects when the current TV channel is changed. The user device may detect the change in TV channel, for example by means of ACR, or alternatively the user device may receive data with details of channel changes directly from a television or a set top box associated with the television, or the channel controller itself.

At step 408 (record time since last change) the channel hop detection app calculates how long it is since the previous channel change and records this value in the memory at the user device. This metric is important to channel hop detection logic utilised by the channel hop detection algorithm, and all calculated values of time elapsed since a previous channel change are recorded. Statistical analysis is performed during step S408 in order to help determine whether a channel change qualifies as a channel hop (as determined in the following step, S410). This statistical analysis is further explained below with reference to FIGS. 31 and 32.

At step S410, the channel hop detection app assesses whether or not the channel change detected at step S406 qualifies as a channel hop. Again, precisely how a channel change is determined to be a qualifying channel hop is explained later with reference to FIGS. 31 to 33.

If it is determined at step S410 that the detected channel change does qualify as a channel hop, then the channel hop counter is incremented by one (step S418) to keep track of the number of channel hops that have occurred since the start of the process.

At step S420 ("Frequency Qualifies?") a Frequency Qualifier threshold value is used to determine whether enough consecutive channel hops have occurred to trigger retrieval and displaying of viewing recommendation data at the user device. If it is determined that there are not enough channel hops, then the procedure returns to step S406 (detect TV channel change). If it is determined that there are enough channel hops, then the process proceeds to step S422. This part of the process is explained in more detail with reference to the frequency qualification, below.

At step S422 (trigger action), the channel hop detection app performs what is termed a "custom action". In this case, this can be the provision of surfing detection signal to the context engine.

At step S424 it is determined whether or not the user of user device 10 engages with any of the one or more viewing recommendation(s) presented to him.

If the user of user device does engage with a viewing recommendation at step S424, that is the user actively interacts with the viewing recommendation in such a way that it can be said the user has successfully found something to watch, then the process moves on to step S414 where the app records in the memory how many channel hops have happened since the previous reset back at step S404. Once the number of hops have been recorded at step S414, the Frequency Qualifier value is recalculated (step S416) which is explained in more detail below. The channel hop counter is then reset at step S404 and the process starts again from step S406 as described above. In this way, the channel hop counter retains a measure of consecutive channel hops.

On the other hand, it may be determined at step S424 that the user of user device does not respond positively to the custom action (i.e. by not selecting one of the at least one viewing recommendation(s)). A user may not respond positively to the viewing recommendation for one or more of reasons, including but not limited to: viewing recommendations being retrieved and displayed too often; none of the choices offered are relevant to the user; the user ignores the viewing recommendations and may decide to do something else rather than interacting with the user device. Note that when there is no positive response to the viewing recommendation at step S424 there is no need to record the number of channel hops at the channel hop counter as per step S414 above, because the user did not successfully find anything to watch from the viewing recommendation(s). Instead, when it is determined that there is no positive response (in other words there is a negative response) from user at step S424, the process moves to step S426. At step S426, the channel hop detection algorithm increments the Frequency Qualifier value by one before the process returns to step S404 where the channel hop counter is reset and the process starts again from step S406 (detect TV channel change) as described above. This new increased value of the Frequency Qualifier value will now continue to be used at decision step S420 ("Frequency Qualifies?") unless one of the following occurs: i) the Frequency Qualifier value is subsequently further incremented by one because the user does not respond positively to a viewing recommendation at step S424; or ii) the user successfully finds something to watch after a period of channel hops, in which case the number of channel hops is recorded (S414) and the Frequency Qualifier value is recalculated at (S416), as explained below.

As explained above channel hop detection process may determine that a user has successfully found something to watch when the user positively responds to a viewing recommendation at step S424. Alternatively the channel hop detection process may determine that the user has successfully found something to watch by themselves because a channel change took place long enough after one or more channel hops. This suggests that the user changed the channel by themselves (that is, without engaging with a viewing recommendation) and has left the television tuned to that channel for a period of time. The channel hop detection process determines that the user has found something to watch by themselves from decision step S410 ("Is hop?"). If it is determined at step S410 that the previous channel change is not a hop then the process moves to step S412 where it is determined whether the channel hop counter has a value of zero (i.e. no channel hops), or a value greater than zero (i.e. one or more channel hops have occurred since the counter was reset set step S404). If S412 determines that the channel hop count is zero the process returns to step S404 and starts again. If step S412 determines that the channel hop count is greater than zero then the number of hops since the last reset (at step S404) are recorded in memory at step S414. In this case, there has been one or more channel hops followed by a non-channel hop; that is, there has been a period of uncertainty as to what channel the user wants to watch followed by a period where the channel has not changed for some time.

Therefore the channel hop data recorded at step S414 describes the user's history of successfully finding something to watch, either by themselves or through a positive response to the custom action (e.g. viewing recommendation).

The best time to present the user with viewing recommendations via the custom action is therefore the rounded-down average number of channel hops taken to successfully find something to watch. When there is fewer than 25 such recorded channel hops recorded, the simple average is used. However, when there are more than 25 channel hops it is the rounded-down average of the last 25 channel hops recorded to memory that is calculated. Using a moving average in this way will smooth out any short-term fluctuations in the trend but still provides for the user's viewing habits that may change naturally over time. Thus the number of recorded channel hops from step S414 is used to recalculate (update) the Frequency Qualifier value at step S416. The updated Frequency Qualifier value is then used by the channel hop detection process at step S420 until the value is either subsequently updated again at step S416 or is incremented by one when the user does not respond positively to the custom action at step S424 (as described above). After the Frequency Qualifier value has been updated at step S416 the process returns to step S404 where the channel hop counter is reset and the process starts again as previously described.

There are many cases where people change channel when they are not "channel hopping". Such occurrences would, without excluding zero counts add too many zero counts to the data being recorded at step S414 and skew the averages.

Therefore according to the channel hop detection process, a simple channel change does not automatically give rise to the recalculation of the Frequency Qualifier value at step S416. In one example, a user may watch 30 minutes of one channel followed by a channel change and then watch the new channel for 20 minutes. In this case because no channel hop has occurred, the channel hop count is zero (S412), and thus no channel hops are recorded (S414) and the Frequency Qualifier value recalculation step (S416) is not reached. This is a desirable outcome as isolated or infrequent channel changes should not reset any temporary increments to the Frequency Qualifier value that have arisen as a result of the user not responding positively to the custom action (viewing recommendation(s)) at step S424.

Back-to-back consecutive negative responses by the user to the custom action (viewing recommendation(s)) would continue to increase the Frequency Qualifier value by one.

This gives the channel hop detection algorithm time to adapt to a better overall Frequency Qualifier value for the user.

The increments by one to the Frequency Qualifier value resulting from negative responses to the custom action (e.g. viewing recommendations(s)) do not affect the channel hop data recorded at step S414 from which the moving average is calculated. The incremented Frequency Qualifier value simply means the Qualifying frequency value is temporarily increased such that the channel hop detection algorithm will only trigger the custom action (S422) if the increased threshold of channel hops is met. This way the viewing recommendations will temporarily be presented to the user less often thus reducing the risk of interrupting or bothering the user.

Figure 31:
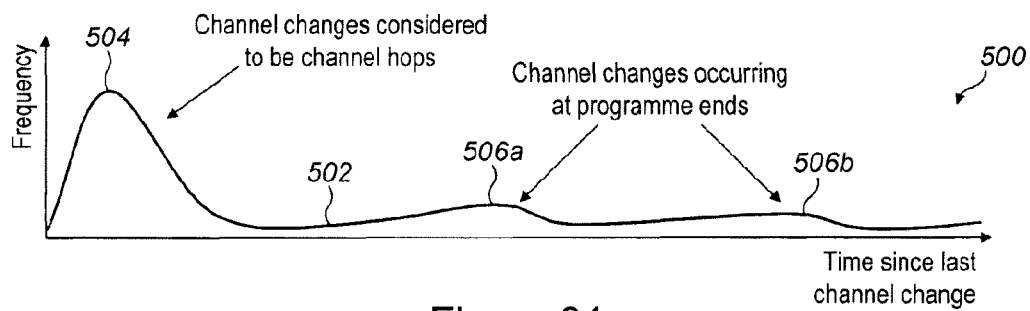
FIG. 31 is a graph showing channel hop behaviour.

Referring now to FIG. 31, the graph 500 is an example graphical representation of the channel changes and channel hops. The graph 500 illustrates typical times between channel changes. The horizontal axis shows the time since the previous channel change, while the vertical axis shows the number of channel changes recorded for the user over discrete periods of time (frequency of channel changes). The curve 502 shown on graph 500 is a smoothed line representing an example data set which we will examine in further detail now.

The curve 502 on graph 500 shows a first peak that is roughly a bell-curve 504. This bell-curve 504 shows that there was a high frequency of channel changes which are likely to qualify as channel hops. That is because a relatively large number of channel changes have occurred quickly after another channel change. For this reason curve 504 may be referred to as channel hop curve 504.

The curve 502 also shows two subsequent minor peaks 506a and 506b. Minor peaks 506a and 506b represent channel changes that occur around the time of the end for television programmes of a popular length e.g. thirty minutes or one hour. For instance the channel changes represented by peaks 506a and 506b reflect the channel changes that might normally be performed by the user at the end of a television programme or piece of content when they are looking to watch something else on a different channel.

As can be seen in FIG. 31, peaks 506a and 506b are significantly smaller than channel hop curve 504 because television programmes have a significant duration spread. Moreover, a user will not always watch content, e.g. a television programme from when that programme actually started and may switch channel to begin watching a programme at any time. As such there is always some level of background channel changes at every point along the horizontal axis, as represented by the non-peak sections of curve 502.

Thus there may be some small grouping of channel changes around the end of television programmes of a popular length (i.e. peaks 506a and 506b) but in this example, the frequency of channel changes at these minor peaks do not qualify as channel hops. Any channel changes that are not channel hops may be eliminated (filtered) by the channel hop detection app performing statistical analysis as described now in relation to FIG. 32.

Figure 32:
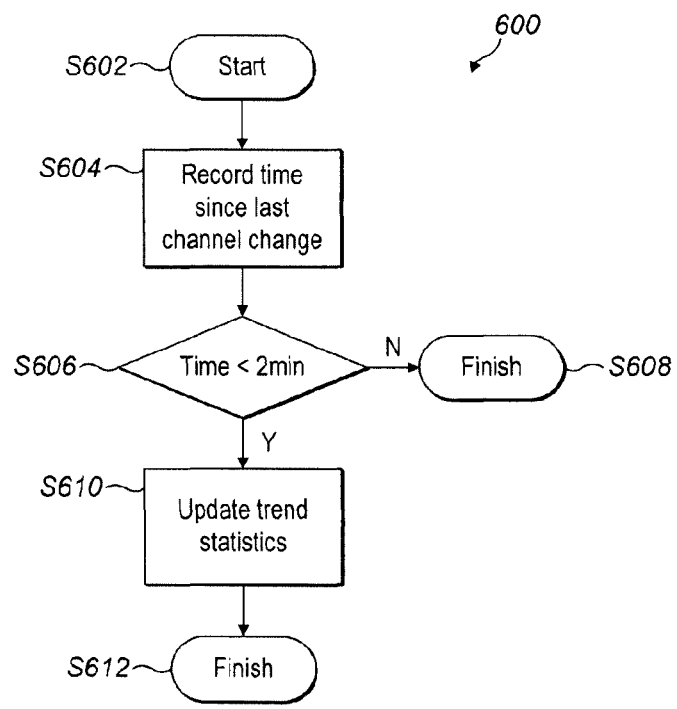
FIG. 32 is a flow chart showing the channel hop behaviour analytics.

FIG. 32 is a flow diagram 600 that illustrates the process of statistical analysis employed by the channel hop detection app during S408 (record time since last change).

The statistical analysis process starts at S602 (start). The process moves on to S604 where the time value since the previous channel change is recorded in the memory 102 at the user device. Note that step S604 is essentially the same as step S408 in FIG. 30.

The statistical analysis process then continues to step S606 where any channel change that happens more than a certain time period, e.g. two minutes, after the previous channel change is filtered and removed. Therefore most of the channel changes, as represented by the data points that do not form the channel hop curve 504 as shown in graph 500, are filtered and the statistical analysis process finishes for these channel changes (at step S608).

For channel changes that happen within the time period, e.g. two minutes, of the previous channel change at step S606, the process moves to step S610. These remaining channel changes (i.e. those channel changes not eliminated at S606) are checked at S610 (update trend statistics) are compiled to see if they form an approximately bell-shaped distribution. Further, at S610 the standard deviation of the remaining channel changes, together with the time at which the peak 504 occurs is determined. Thus the channel changes have been filtered and analysed. This analysis can be static or adaptive analysis.

Figure 33:
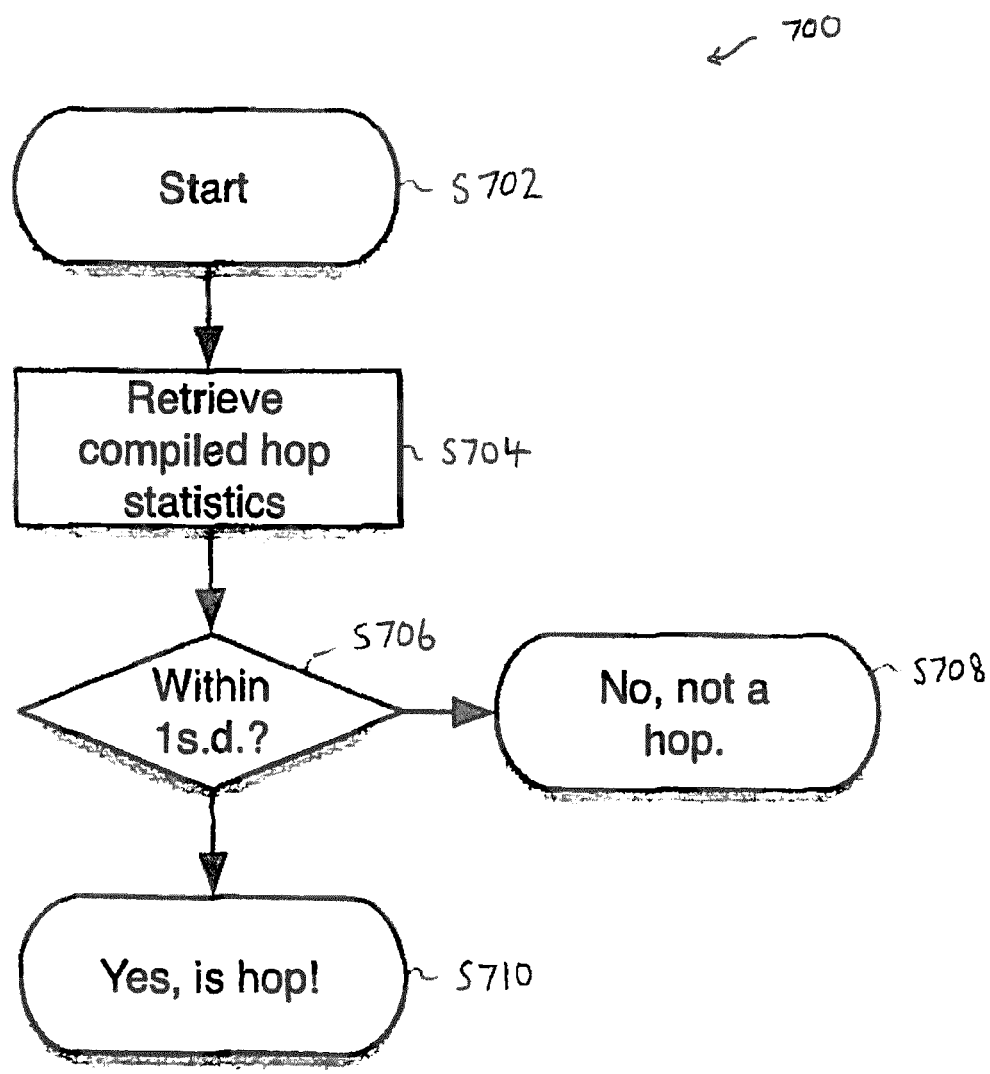
FIG. 33 is a flow chart showing a channel hop logic process.

Once the channel changes have been filtered and analysed according to the statistical analysis process in 600, the channel hop detection logic is utilised to confirm whether the channel changes compiled in S610 are actually channel hops. Reference is made to FIG. 33 to illustrate the channel hop logic process.

The channel hop logic process starts at step S702 (start). The process moves to step S704 where the compiled change statistics are retrieved. At step S706 the hop logic process checks to determine that any channel change is within one standard deviation of the peak of the channel hop curve 504. If the channel changes are within the one standard deviation, the process confirms that the channel change is indeed a channel hop (S710). If the channel change is outside of the one standard deviation of channel hop curve 504, then the channel change is determined to be merely a channel change and not a channel hop (S708). These remaining channel changes may be filtered so that only channel hops are considered in the remaining process steps of FIG. 30, i.e. from steps S410 onwards.

Referring back to step S420 of the channel hop detection app, the qualifying frequency that stipulates how many channel hops is enough to trigger the user device to retrieve viewing recommendation data from server 16 must first be determined so that the trigger action at S422 is correctly activated and only when the qualifying frequency is met.

Because the qualifying frequency is determined at S416 from recording the channel hop count (S414) just before each time the counter is reset (S404) or when the Frequency Qualifier value is incremented by one when there is a negative response to the viewing recommendation(s), the optimal number of channel hops to observe before triggering the custom action (i.e. retrieval and display of viewing recommendations) can be determined by the channel hop detection app.

For example, if the average number of channel hops is less than the determined frequency qualification value, then the frequency qualification value is reduced by the channel hop detection app until the trigger action at step S422 is activated (such that viewing recommendations are retrieved and displayed at the user device).

On the other hand, if viewing recommendations are being shown too often with the user not engaging with them (dismissing or ignoring the recommendations displayed at the user device), then the frequency qualification value needs to be increased.

Aspects of the inventions described herein include any or all of the following features used in any combination. In addition, methods, and computer programs for implementing the method, are contemplated.

A content delivery server configured to select from multiple content items a set of content items for display to a user at a user terminal, the content delivery having access to content identifier, identifying a context for delivery of the set of assets;
- a processor operating a content selection program which is arranged to receive the context data for different contexts and to select a set of content items in dependence on the context data, wherein the content items in the set vary with the context data, such that the content of items in a first set for a user in a first context are different from the content of items in a second set for the same user in a second context, and
- to transmit a recommendation message to the user terminal comprising a set of asset identifiers.
- contact item identifiers identify different types of content—from video, short form video, social fees, news read
- set of content items include at least one video asset
- each set of content items include different types of items
- type of content items vary with context
- content of items vary with context
- number of content items vary with context
- context data defines one of
  - current time
  - available time for a user to engage with an asset
  - location of the user terminal
  - type of devices constituting the user terminal
- server has access to a user profile holding preferences of a user for use by the content selection program
- each user profile comprises multiple sub profiles for the user, each sub profile associated with a respective context, wherein the context data selects its associated sub profile.
- wherein the content selection program comprises a recommendation algorithm which selects the content item based on a first source of content in the first context and on a second source of content in the second context
- source of content is social media
- source of content is breaking news item
- source of content is a live feed updating the user terminal
- source of content is a live feed accessible to the server A computer device operating as a user terminal and comprising:
- a display for displaying assets to a user,
- at least one context sensors configured to sense a context of the user terminal and generate a context data item,
- a context collector configured to receive the at least one context data item and to generate context data,
- an interface for transmitting the context data to a content delivery server and for receiving a recommendation message from the content delivery server comprising a set of asset identifiers for asset selected based on the context data, wherein the display is operable to display the selected assets.
- context data includes information about live streams supplied to the user terminal
- context sensor include
  - clock
  - location module
  - Bluetooth
  - WiFi
- context setting component to display configurable context settings to a user connection to a video asset server for accessing video assets identified by the recommendation message
connection to content sources for accessing content identified by the recommendation message.

A content delivery system comprising:
a) a control server having:
- a recommendation engine for recommending consumer content;
- means for accessing a memory holding user profiles accessible by the recommendation engine;
- a first interface for exchanging messages between the processor and a user device; wherein context data is received from the user device;
- a second interface for receiving source content from multiple content sources and supplying the source content to the recommendation engine for use when indicated by the context data;
b) a user device in communication with the control server and the multiple content sources and configured to access source content from one or more of the multiple content sources on receipt of a content recommendation message from the control server identifying said one or more of the multiple content sources;
c) a store of video asset identifier accessible by the recommendation engine;
wherein the context data defines one of multiple contexts of the user terminal, a context for recommending consumer content wherein a video asset is recommended by matching content from the multiple content sources.
wherein a server provider has control over the content sources available to the second interface
wherein the user device has a display and processor configured to execute a consumer application (app) which collects context data defining a context of the user device to transmit to the control server and controls the display to display recommended video assets.

A video content delivery system comprising;
- a control server configured to deliver to a user terminal a content recommendation message containing a sequence of content item tiles, each tile having a content item locator usable to locate an item of content and the tiles being ordered with respect to other tiles in the sequence;
- content storage holding content items of different types, each item accessible by a user terminal responsive to a locator derived from the recommendation message at the user terminal;
- a user terminal configured to execute a content delivery application which reads the locators in the recommendation message, accesses content items identified in the message and delivers them to a display of the user terminal wherein the order of the tiles governs the display layout at the user terminal.
wherein content types vary and each tile has a type identifier
each tile has an ordering number identifying its order in the sequence
each tile has one or more of the elements shown in FIG. 6
wherein the content item of each tile is displayed in a display zone associated with the ordering number of the tile
wherein the ordering of tiles in the recommendation message is based on a user profile or user sub profile or context data wherein the context data is received from the user terminal wherein the context data selects a user sub profile wherein each tile has a weighting which denotes the importance of the tile, the weighting governing the size of a display zone in the display layout at the user terminal, wherein content items with higher weightings are displayed in a display zone with a greater size wherein the ordering number identifies a location of a display zone, tiles with an earlier ordering number having more prominent display locations wherein the display zones are square or rectangular resembling tiles wherein the configuration of the tiles on the display is alterable by a user, and wherein the ordering of tiles depends on the user selected configuration which is received at the server from the user terminal A computer device having a display for displaying to a user at least one content item;

an audio output for generating an audio signal associated with the content item;

wherein the display is provided on a user interface which is configured to detect a user input in the form of a swipe action over the displayed content item, wherein the audio output is responsive to the direction of swipe such that the volume of the audio varies depending on the direction of swipe by a user.

wherein multiple content items are displayed simultaneously on the display, and wherein a swipe action over one content item mutes the audio of other content items which are simultaneously displayed wherein multiple content items are displayed, and a swipe action on one content item unmutes a previously muted content item, while not changing the status of other muted content items content items are video assets A content delivery system comprising:

a control server configured to receive a request for content from a user device which is one of a number of device types and to select a set of video assets responsive to the request, a user device coupled to the control server over a communication network and a screen configured to display each video asset in the set in a respective display zone;

wherein each video asset displays a moving image on the screen, the user device having a processor responsive to user engagement with a selected one of the moving images to transmit to the control server a request for further content, said further content dependent on the content of the selected moving image.

display zones are non-overlapping further content also dependent on context data defining a context of the user device in a first context, further content is a long form version of a displayed short form video asset in a second context, further content is a static article, e.g. news wherein the display provides to the user a user actuatable feedback button indicating whether a user has interest in a selected content item only at a certain or at all (don't wait now/don't wait ever)

actuation of an empty tile brings up a choice of types of assets so the user can select what he wants

The invention claimed is:

1. A content delivery server configured to select from multiple content items a set of content items for display to a user at a user device, the content delivery server having access to content identifiers and identifying content items for delivery, the content delivery server comprising:

a context collector for receiving context data from a plurality of user devices, the context data from each user device comprising a plurality of context parameters of the user device, where each context parameter defines a characteristic of each user device measured locally at each user device;

a context summarizer for summarizing the context data received from the plurality of user devices into anonymous data sets, each anonymous data set associated with a context, and each anonymous data set comprising a plurality of the context parameters, wherein the context defines a user behavior at a user device;

a context engine for comparing the context data of a given user device to the anonymous data sets summarizing the context data received from the plurality of users and determining at least one probability of a context of the user of the given user device in dependence on comparing its context data to the anonymous data sets summarizing the context data received from the plurality of users, assessing whether the at least one probability exceeds a threshold, determining each context for which the probability exceeds the threshold as being a context of the given user device, determining at least one recommendation for the given user device based on the determined contexts; and transmitting a recommendation message to the given user device, the recommendation message comprising at least one content identifier in dependence on the at least one recommendation, wherein the comparison with the anonymous data sets summarizing the context data received from the plurality of users is used to adjust the determined context.

2. A content delivery server according to claim 1, wherein the content identifiers identify different types of content selected from video, short form video, social fees, news read.

3. A content delivery server according to claim 1, wherein the set of content items includes at least one video asset.

4. A content delivery server according to claim 1, wherein each set of content items includes different types of items.

5. A content delivery server according to claim 1, wherein the type of content items varies with context.

6. A content delivery server according to claim 1, wherein the content of content items varies with context.

7. A content delivery server according to claim 1, wherein the number of content items varies with context.

8. A content delivery server according to claim 1, wherein the server has access to a user profile holding preferences of a user for use by a content selection program.

9. A content delivery server according to claim 8, wherein each user profile comprises multiple sub profiles for the user, each sub profile associated with a respective context, wherein the associated sub profile is selectable by context and/or by the user.

10. A content delivery server according to claim 8, wherein the content selection program comprises a recommendation algorithm which selects the content item based on a first source of content in a first context and on a second source of content in a second context.

11. A content delivery server according to claim 1, wherein a source of content is social media or a breaking news item.

12. A content delivery server according to claim 1, wherein a source of content is a live feed updating the user device or a live feed accessible to the server.

13. A content delivery server according to claim 1, where the user device comprises:
- a display for displaying content items to a user;
- at least one context sensor configured to sense a characteristic of the user device and generate a context data item;
- a context collector configured to:
  - receive at least one context data item;
  - perform calculations based on the at least one context data item; and
  - generate context data, and
- an interface for transmitting the generated context data to a content delivery server and for receiving a recommendation message from the content delivery server comprising a set of content item identifiers for content items selected based on at least one inferred probability of a context of the user, wherein a context defines a user behavior at the user device, and each probability of a context is inferred in dependence on the transmitted context data, wherein the display is operable to display the selected content items.

14. A content delivery server as claimed in claim 13, wherein the context data includes information about live streams supplied to the user device.

15. A content delivery server as claimed in claim 13, wherein the context sensor comprises one of: a clock; a location module; Bluetooth; WiFi.

16. A content delivery server as claimed in claim 13, further comprising a context setting component operable to display configurable context settings to a user.

17. A content delivery server as claimed in claim 13, wherein the user device comprises a connection to a video asset server for accessing video assets identified by the recommendation message and/or a connection to content sources for accessing content identified by the recommendation message.

18. The content delivery server according to claim 1, in which the context engine is configured to transmit the determined context of the user device to the user device, and receive a confirmation of the determined context.

19. A method for delivering content by selecting from multiple content items a set of content items for display to a user at a user device, the method comprising:
- receiving context data from a plurality of user devices, the context data from each user device comprising a plurality of context parameters of the user device, where a context parameter defines a characteristic of each user device measured locally at each user device;
- summarizing the context data received from the plurality of user devices into anonymous data sets, each anonymous data set associated with a context, and each anonymous data set comprising a plurality of the context parameters, wherein the context defines a user behavior at a user device;
- comparing the context data of a given user device to the anonymous data sets summarizing the context data received from the plurality of users;
- determining at least one probability of a context of the user of the given user device in dependence on comparing its context data to the anonymous data sets summarizing the context data received from the plurality of users;
- assessing whether the at least one probability exceeds a threshold;
- determining each context for which the at least one probability exceeds the threshold as being a context of the user device;
- determining at least one recommendation for the given user device based on the determined contexts; and
- transmitting a recommendation message to each user device comprising at least one content identifier in dependence on the at least one recommendation, wherein the comparison with the anonymous data sets summarizing the context data received from the plurality of users is used to adjust the determined context.

20. The method of claim 19 further comprising:
- transmitting the determined context of the user device to the user device, and
- receiving a confirmation of the determined context of the given user.

* * * * *